United States Patent [19]

Scheuneman et al.

[11] Patent Number: 4,652,993
[45] Date of Patent: Mar. 24, 1987

[54] MULTIPLE OUTPUT PORT MEMORY STORAGE MODULE

[75] Inventors: James H. Scheuneman, St. Paul; Gary D. Burns, Cottage Grove, both of Minn.

[73] Assignee: Sperry Corporation, New York, N.Y.

[21] Appl. No.: 596,214

[22] Filed: Apr. 2, 1984

[51] Int. Cl.[4] .............................................. G06F 9/18
[52] U.S. Cl. ................................................ 364/200
[58] Field of Search ................................. 364/200, 900

[56] References Cited

U.S. PATENT DOCUMENTS

| | | | |
|---|---|---|---|
| 3,699,530 | 10/1972 | Capowski et al. | 364/200 |
| 3,761,894 | 9/1973 | Pilc et al. | 364/200 |
| 3,792,439 | 2/1974 | Auspurg et al. | 364/200 |
| 3,967,250 | 6/1976 | Senda et al. | 364/200 |
| 4,044,333 | 8/1977 | Auspurg et al. | 364/200 |
| 4,384,342 | 5/1983 | Imura et al. | 364/900 |
| 4,513,374 | 4/1985 | Hooks, Jr. | 364/200 |

*Primary Examiner*—Gareth D. Shaw
*Assistant Examiner*—Randy W. Lacasse

*Attorney, Agent, or Firm*—Charles A. Johnson; Lawrence J. Marhoefer

[57] ABSTRACT

Within a High Performance Storage Unit (HPSU) digital memory resource, plural ones (up to 4) of a multiplicity (nominally 8) of independently operative storage memory banks, each consisting of four storage modules, are each simultaneously communicating voluminous read data (nominally 144 data bits plus 16 parity bits) read from each to a respective one of plural (nominally 4) output ports of the memory resource, said communicating being upon and via a selected one of a like plural number (4) of wired-OR communication buses. Priority control does assure that all (up to 4 such) of the (8) storage memory banks simultaneously reading data are (1) each doing so responsively to a request arising upon a different one of (4) memory resource input ports, and are (2) each controlled to selectively emplace the data read upon one only of a multiple number (4) of output ports of the (8) storage memory banks, and the (4) storage modules within each of the (8) storage memory banks—respective ones of each of the (4) storage memory bank ports connecting to a respective one of the four (4) wired-OR communication buses.

2 Claims, 11 Drawing Figures

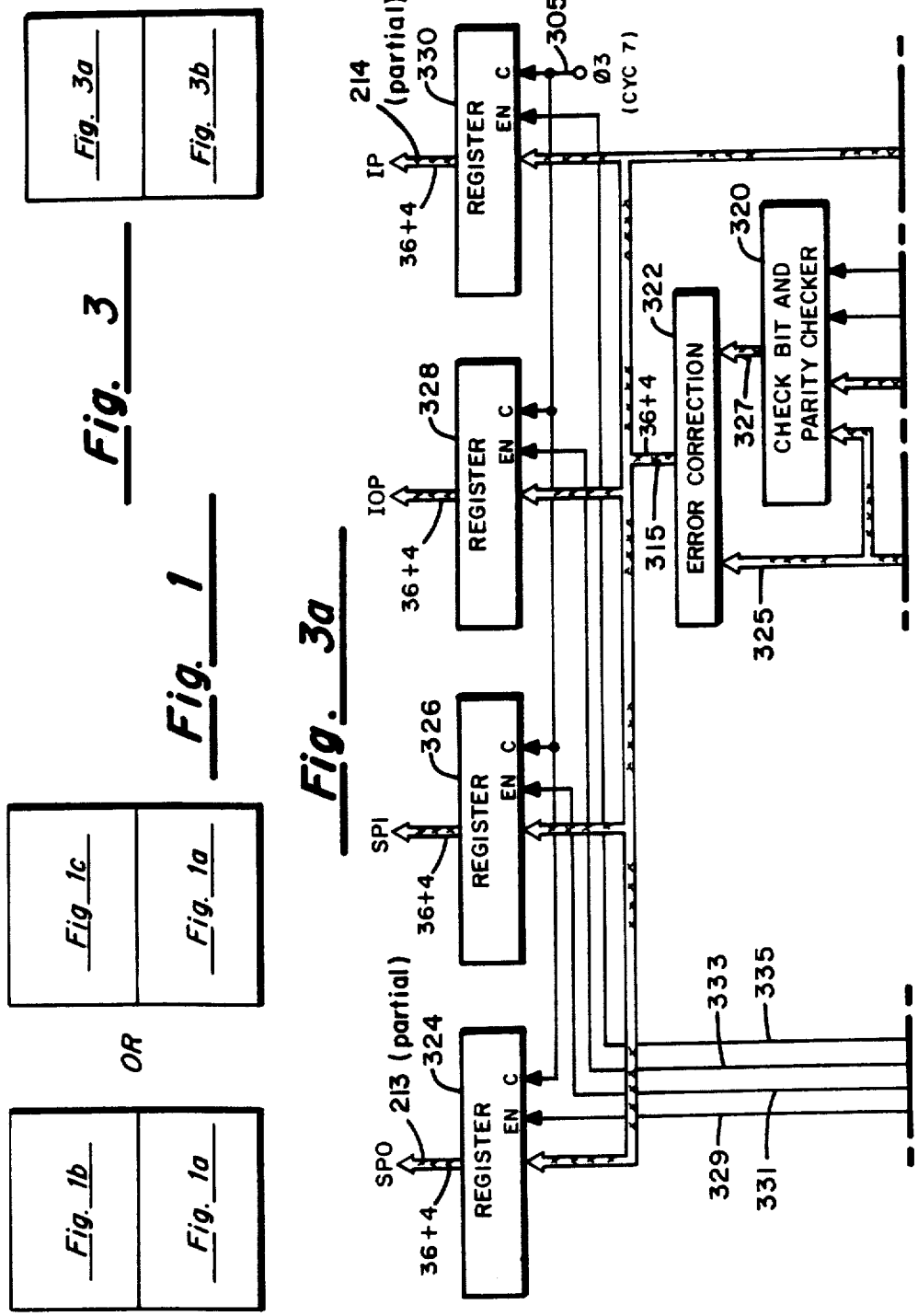

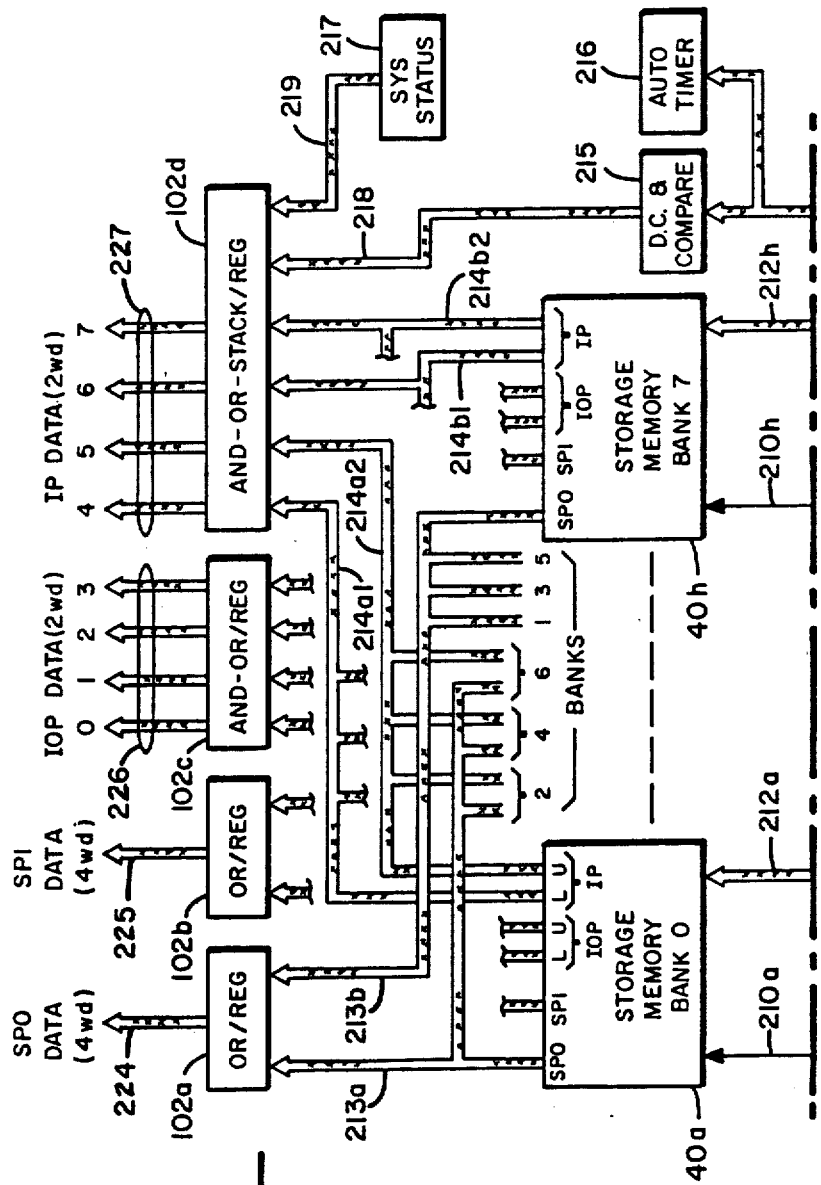

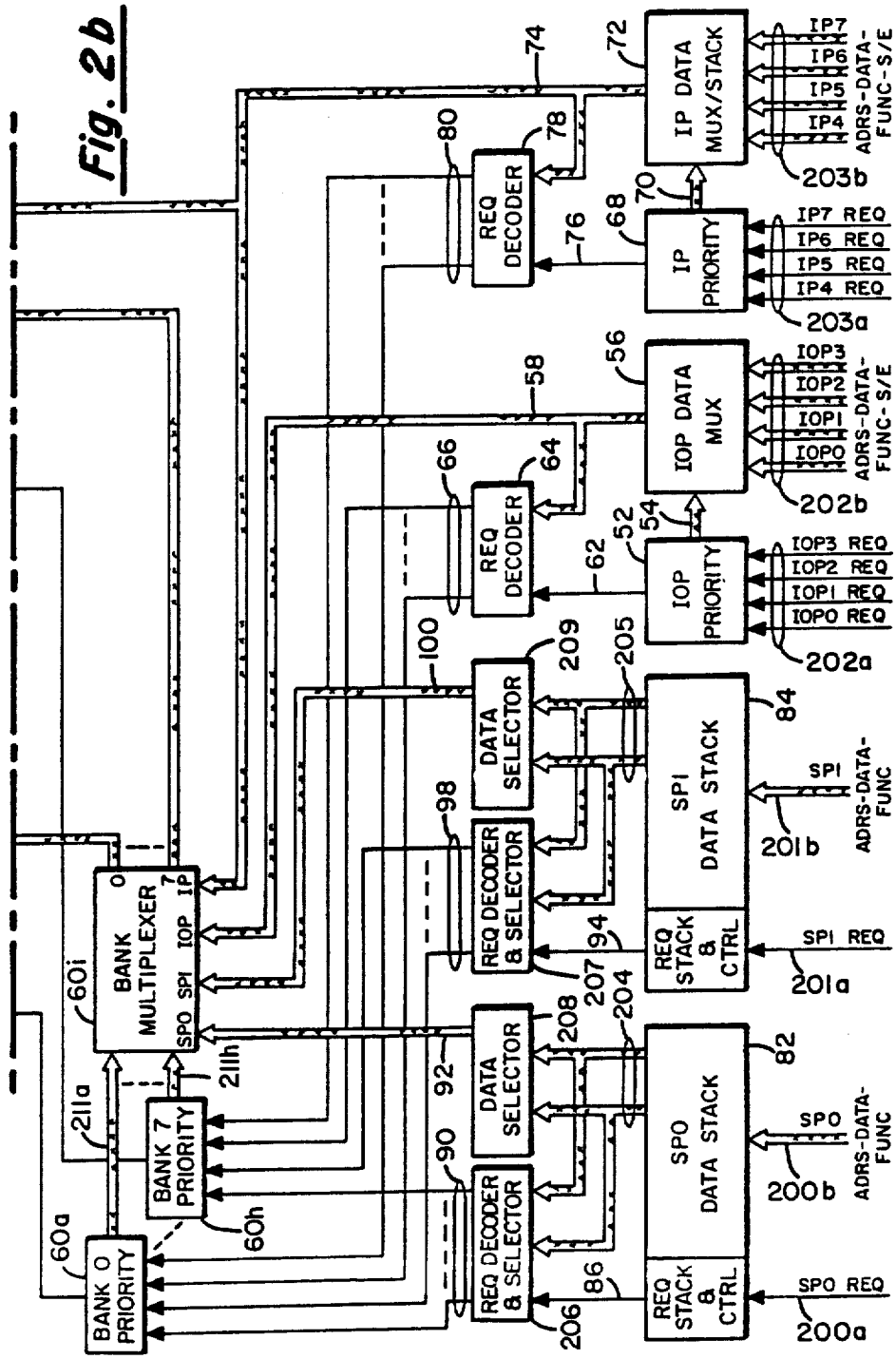

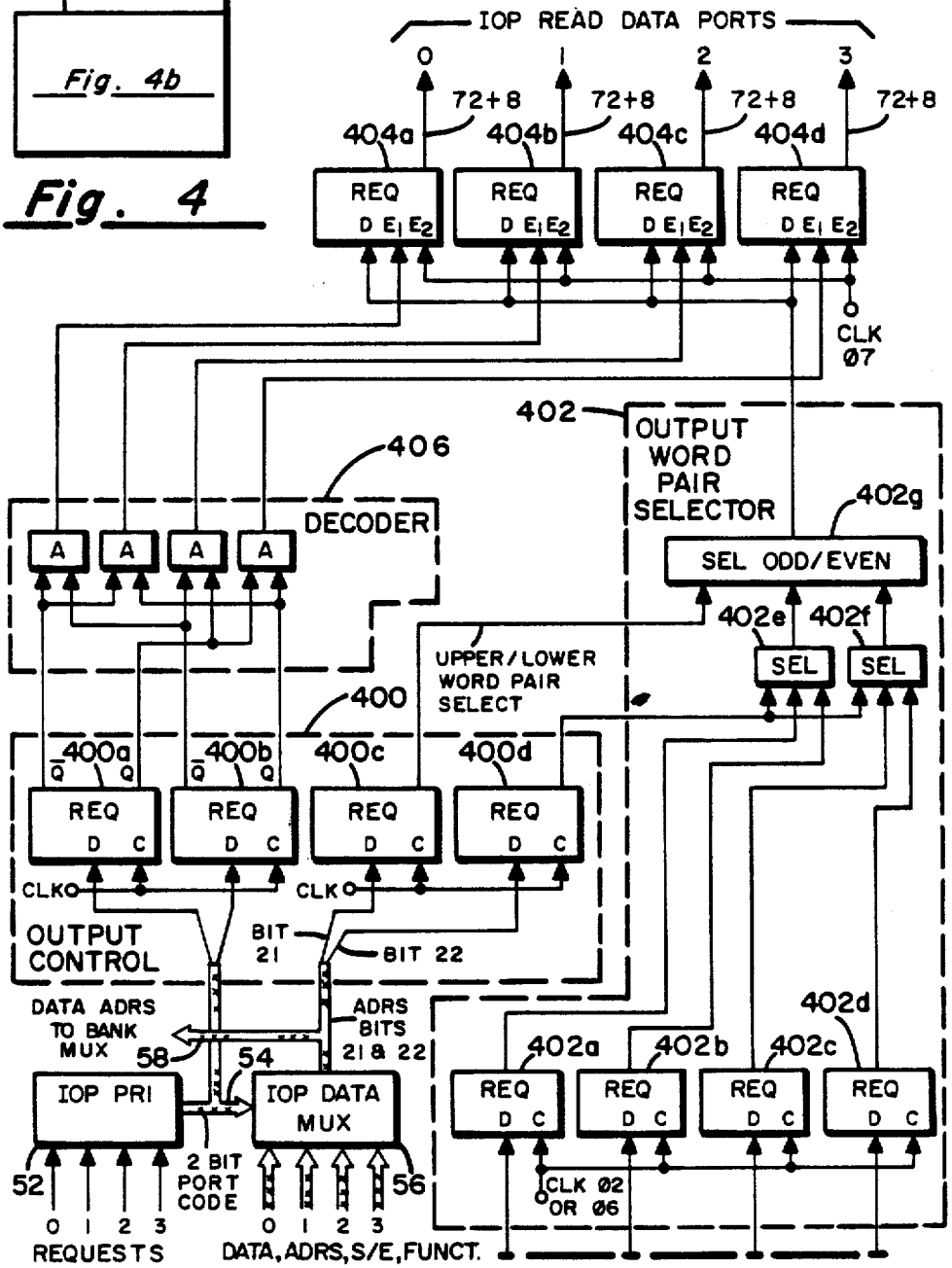

MULTIPLE OUTPUT PORT MEMORY STORAGE MODULE

CONTENTS

RELATED PATENT APPLICATIONS
BACKGROUND OF THE INVENTION
  A. Field of the Invention
  B. State of the Prior Art
    1. Environment of the Invention
    2. Description of the Prior Art
OBJECTS
  A. General Objects
  B. Specific Objects
SUMMARY OF THE INVENTION
  A. General Function of the High Performance Storage Unit Within Which the Present Invention Resides
  B. Function of the Present Invention of Multiple Output Port Memory Storage Modules
BRIEF DESCRIPTION OF THE DRAWINGS
DESCRIPTION OF THE PREFERRED EMBODIMENT
  A. Conventions
  B. General Principles of the Invention
  C. The Present Invention Resides in a High Performance Storage Unit (HPSU)
  D. General Description of the HPSU
  E. Detailed Description of the HPSU Block Diagram
  F. Detailed Description of the HPSU Block Diagram Continuing at the Site of the Present Invention
  G. Multiple Output Port Storage Module
  H. Gating of the Wired-OR Communication Buses onto the Output Ports of the HPSU, and Further Gating of the Read Data to One of Multiple Requestors Communicating with such Port
CLAIMS

RELATED PATENT APPLICATIONS

The following co-pending patent applications are assigned to the assignee of this invention, and their teachings are incorporated herein by reference:

Title: HIGH PERFORMANCE STORAGE UNIT
  Inventer: James H. Scheuneman
  Ser. No.: 596,130
  Filed: Apr. 2, 1984
Title: READ ERROR THROUGH-CHECKING SYSTEM
  Inventor: James H. Scheuneman
  Ser. No.: 354,340
  Filed: Mar. 2, 1982
Title: READ ERROR OCCURRENCE DETECTOR FOR ERROR CHECKING AND CORRECTING SYSTEMS
  Inventors: Gary D. Burns and Scott D. Schaber
  Ser. No.: 464,184
  Filed: Feb. 1, 1983
Title: MULTIPLE UNIT ADAPTER
  Inventer: James H. Scheuneman
  Ser. No.: 596,205
  Filed: Apr. 2, 1984
Title: A PRIORITY REQUESTER ACCELERATIOR
  Inventers: John R. Trost and Daniel Zenk
  Ser. No.: 530,285
  Filed: Aug. 31, 1983
Title: PARTIAL DUPLEX OF PIPELINED STACK WITH DATA INTEGRITY CHECKING
  Inventer: James H. Scheuneman, et al.
  Ser. No.: 595,864
  Filed: Apr. 2, 1984
Title: PIPELINED DATA STACK WITH ACCESS THROUGH-CHECKING
  Inventor: James H. Scheuneman
  Ser. No.: 596,131
  Filed: Apr. 2, 1984
Title: MULTIPLE PORT MEMORY WITH PORT DECODE ERROR DETECTOR
  Inventor: James H. Scheuneman
  Ser. No.: 596,132
  Filed: Apr. 2, 1984
Title: HIGH PERFORMANCE PIPELINED STACK WITH OVER WRITE PROTECTION
  Inventor: Wayne A. Michaelson
  Ser. No.: 596,203
  Filed: Apr. 2, 1984
Title: AN IMPROVED ACCESS LOCK APPARATUS FOR USE WITH A HIGH PERFORMANCE STORAGE UNIT OF A DIGITAL DATA PROCESSING SYSTEM
  Inventers: Daniel K. Zenk and John R. Trost
  Ser. No.: 596,202
  Filed: Apr. 2, 1984
Title: MULTILEVEL PRORITY SYSTEM
  Inventers: James H. Scheuneman and Wayne A. Michaelson
  Ser. No.: 596,206
  Filed: Apr. 2, 1984
Title: PIPELINED SPLIT STACK WITH HIGH PERFORMANCE INTERLEAVED DECODE
  Inventers: James H. Scheuneman and Waybe A. Michaelson
  Ser. No.: 596,215
  Filed: Apr. 2, 1984.

BACKGROUND OF THE INVENTION

A. Field of the Invention

This invention relates to the field of digital data processing systems wherein one or more host data processors utilize one or more supporting scientific processors in conjunction with storage systems that are commonly accessible. More particularly it relates to an improved High Performance Storage Unit (HPSU) memory resource for use in such a digital data processing system. Still more particularly it relates to an improvement in the manner of simultaneously moving a large number of data words within a particular functional area of such an HPSU, particularly between a number of memory storage areas concurrently operative for the reading of such data words to a number of output registers which supply such read data to those particular requestors of such HPSU which did make reference thereto. Still more particularly, it relates to a plurality of concurrently operative storage memory banks (nominally 8) containing storage memory modules (nominally 4 in each bank) the multiple output ports (nominally 4 called SP0, SP1, IOP, and IP) of each which module are respectively wired-OR interconnected to form nominally 4 very wide (nominally 144 data bits + 16 parity bits) and fast (the data outputs of addressable memory stores of 4,194,304 words of 36-data-bits + 8-error-syndrome and parity bits, which stores are of necessity physically extensive, will be moved to register/drivers outputting such data to appropriate requestors in nominal 22.5 nanoseconds) wired-OR data buses.

B. State of the Prior Art

1. Environment of the Invention

Digital data processing systems are known wherein one or more independently operable data processors function with one or more commonly accessible main storage systems. Systems are also known that utilize a support processor with its associated dedicated supporting, or secondary storage system. Such support processors are often configured to perform specialized scientific computations and are commonly under task assignment control of one of the independently operable data processors. The controlling data processor is commonly referred to as a "host processor". The host processor characteristically functions to cause a task to be assigned to the support processor; to cause required instructions and data to be transferred to the secondary storage system; to cause the task execution to be initiated; and to respond to signals indicating the task has been completed, so that results can be transferred to the selected main storage systems. It is also the duty of the host processor to recognize and accommodate conflicts in usage and timing that might be detected to exist. Commonly, the host processor is free to perform other data processing matters while the support processor is performing its assigned tasks. It is also common for the host processor to respond to intermediate needs of the support processor, such as providing additional data if required, responding to detected fault conditions and the like.

In the past, support scientific data processors have been associated with host data processing systems. One such prior art scientific processor is disclosed in U.S. Pat. No. 4,101,960, entitled "Scientific Processor" and assigned to Burroughs Corporation, of Detroit, Michigan. In that system, a single instruction multiple data processor, which is particularly suited for scientific applications, includes a high level language programmable frontend processor; a parallel task processor with an array memory; a large high speed secondary storage system having a multiplicity of high speed input/output channels commonly coupled to the front-end processor and to the array memory; and an over-all control unit. In operation of that system, an entire task is transferred from the front-end processor to the secondary storage system whereupon the task is thereafter executed on the parallel task processor under the supervision of the control unit, thereby freeing the front-end processor to perform general purpose input/output operations and other tasks. Upon parallel task completion, the complete results are transferred back to the front-end processor from the secondary storage system.

It is believed readily seen that the front-end processor used in this earlier system is a large general purpose data processing system which has its own primary storage system. It is from this primary storage system that the entire task is transferred to the secondary storage system. Further, it is believed to be apparent that the entire task is transferred to the secondary storage system. Further, it is believed to be apparent that an input/output path exists to and from the secondary storage system from this front-end processor. Since task transfers involve the use of the input/output path of the front-end processor, it is this input/output path and the transfer of data thereon between the primary and secondary storage systems which becomes the limiting link between the systems. Such a limitation is not unique to the Scientific Processor as disclosed in U.S. Pat. No. 4,101,960. Rather, this input/output path and the transfers of data are generally considered to be the bottleneck in many such earlier known systems.

The present scientific data processing system is considered to overcome the data transfer bottleneck by providing an unique system architecture using a high speed memory unit which is commonly accessible by the host processor and the scientific processor. Further, when multiple high speed storage units are required, a multiple unit adapter is coupled between a plurality of high speed memory units and the scientific processor.

Data processing systems are becoming more and more complex. With the advent of integrated circuit fabrication technology, the cost per gate of logic elements is greatly reduced and the number of gates utilized is ever-increasing. A primary goal in architectural design is to improve the through-put of problem solutions. Such architectures often utilize a plurality of processing units in cooperation with one or more multiple port memory systems, whereby portions of the same problem solution may be parcelled out to different processors or different problems may be in the process of solution simultaneously.

2. Description of the Prior Art

It is of known utility in the prior computer art that a multiplicity of requester processors, such as commandarithmetic processors, input/output processors, and/or scientific processors, should be communicative with a single, common, concurrently shared random access memory storage resource. Such requester users of the memory resource are communicative with the resource through physical ports, upon which ports requests are registered and results are obtained. Such a common, concurrently shared, computer memory resource may be called, especially if such resource is large and fast, a High Performance Storage Unit.

Within the common, concurrently shared, memory resource or High Performance Storage Unit, the numbers of the storage sites which are concurrently operative in parallel in service of multiple ones of communicating requesters is a function of the desired bandwidth of response of such memory resource to individual ones of such requesters, and to multiple ones or to all of such requesters in aggregate. A typical division, or site, of a memory resource is called a bank, of which, for example, there might be eight such each containing 524K 44 bit words within a very large memory unit. Normally, diversity of addressable references in pending requests permitting, all such banks may be simultaneously operative in the performance of separate and unrelated address references to storage locations therein, such as reading and writing references. Within a memory bank, further subdivisions, or subsites, of memory function may further exist. These subsites are nominally called storage modules, of which, for example, four such each comprising, for example, 131K words of 44 bits each, might constitute one bank. The storage modules within a single bank are also supportive, the addressable references and the types of operations performed permitting, of simultaneous operation on related, contiguous, addresses. Successive operations within each such storage module are also normally pipelined. The particular prior art numbers, constructions, and concurrencies of operation of memory banks and memory storage modules in enabling the prior art performance of the concurrently shared memory resource function is not of importance in understanding the present invention, the pertinent concept being only that within a high performance concurrently shared memory resource there are necessarily a number of memory storage areas, be they banks or storage modules or whatever, which are concurrently active to perform memory references, such as data reads and writes.

To this point, there are thus three concepts in the prior art construction of high performance memories which are pertinent to the understanding of the present invention. First, the memory resource is shared. Shared does not merely mean that the memory resource is universally communicative, and that the various requesters of such memory resource may ultimately sequentially obtain reference to all addressable parts thereof, but rather additionally means that all requesters do compete, in a priority scheme within the common front-end logics of the memory resource, for access to the total referencable stores thereof. The second pertinent prior art concept is that in order to support concurrent access, then such one memory resource, communicative with a multiplicity of requesters, will contain internal referencable and addressable memory stores which are granularized, by banks and/or by storage modules or by whatsoever named subdivision, to be concurrently and simultaneously operative in the provision of response to memory references, such as the reading of data words. Finally, the third pertinent prior art concept is that the referenced data simultaneously developed at the multiplicity of internal memory stores sections and subsections, the banks and storage modules, must be correctly distributed to the multiplicity of requesters which have made the corresponding references of the memory resource, and of the memory stores therein. It is this functional area of a concurrently shared memory resource—how a multiplicity of data words concurrently referenced within a shared memory store may be distributed to that multiplicity of requestors which (in a priority scheme) did give rise to such concurrent references—that is the area of the present invention.

The prior art computer science method for moving the outputs of a multiplicity of data sources, such as the banks and storage modules of a shared memory resource, to a multiplicity of destination sinks for such data, such as the requesters of a memory resource, is called multiplexing. The circuitry which performs this distribution function is a multiplexer. A multiplicity of multiplexers may operate concurrently. Therefore it starts to look like a lot of words which define the area of the present invention—words like "shared", "priority", and "bank" or "storage modules"—are irrelevant: multiplex the data distribution between the sources and the destinations and be done with it.

Now it is indeed known in the prior art to use brute force multiplexing within a memory resource to perform distribution between a multiplicity of source sites, or banks, concurrently operative therein to deliver data words and those destinations, or ports, to which such data words must be delivered. The alternative solution of the present invention will, however, be based on the consideration of some secondary factors reading on the desirability of brute force multiplexing of data from sources (banks) to destinations (ports) within a shared memory resource—factors associated with words like "shared" and "priority", plus "bank" and "storage module".

The prior art known to the disclosers of the present invention which is associated with the sharing of data stores, and the prioritization of multiple concurrent references thereto does not extend so far that such prior art can be clearly seen to be a factor motivating that solution offered by the present invention. The improvement to such prior art taught in U.S. patent application Ser. No. 596,206 for a MULTILEVEL PRIORITY SYSTEM in the name of J. H. Scheuneman, et al., filed on an equal date with the present disclosure and assigned to the same assignee, does extend the computer art associated with the prioritization of multiple concurrent references so far that such art can more clearly seen to be a factor motivating that solution offered by the present invention. All such art associated with the prioritization of multiple concurrent references to shared data stores, both the prior art and the extension to such art in U.S. patent application Ser. No. 596,206 is discussed in this BACKGROUND OF THE INVENTION section in order to sensitize the reader to certain features in such art which bear upon the present invention. These features are located in that prioritization occurring in the "front" end of a shared memory resource and thus seemingly remote from the multiplexed distribution of data occurring in the "back" end of the same shared memory resource. In the prior art it is known to prioritize a small number of requestors, say four requestors, for shared concurrent access to memory stores within a number of memory banks, say eight banks. The prior art multiplexed distribution of the data from the eight banks to the four parts then requires and uses four eight-to-one (8:1) multiplexers (sometimes called demultiplexers). In the prior art it is also known to prioritize a larger number of requestors, say eight requestors, for shared concurrent access to memory stores within a number of memory banks, say eight banks. The prior art multiplexed distribution of the data from the eight ports to the eight banks then requires and uses eight eight-to-one (8:1) multiplexors. But prioritization of this larger number of requestors, eight requestors, may be unsuitably time consuming in two ways if some one or ones of the eight requestors are uniquely time critical, and require a maximally fast response from the shared memory resource. First, the wider width of the priority resolution, eight requestors wide, becomes much slower by a time which may be a very significant fraction of the overall memory resource response time. Second, if the uniquely time critical requestor(s), which of course are accorded the highest priorities within any one priority scan, is (are) itself (themselves) very fast with repetitive requests to the memory resource (which is entirely probable—the reason that a critical requestor(s) wants memory data fast is usually that it runs very fast), then such time critical requestor(s) will monopolize the memory, locking out lower priority requestors from access. In order to prevent this, a snapshot priority, wherein all pending requests are serviced at least once within each priority scan, is often employed. But such snapshot priority intersperses numbers of lower priority requests with the (higher priority) requests of time critical requestors—thus defeating the maximization of the time performance of the memory resource to such time critical requestors.

The invention of a MULTILEVEL PRIORITY SYSTEM within U.S. patent application Ser. No. 596,206 is one approach to solving both problems: permitting a relatively more narrow and faster priority resolution (at least to the time critical requestor(s)) while also according that a larger number of requestors (nominally eight) may be prioritized so that lower priority requestors are not locked out even though time critical (high priority) requestors are not unduely delayed in obtaining maximal time response from the memory resource. When such a MULTILEVEL PRIORITY SYSTEM is within the "front" end of a memory resource, the present invention of a multiple output port memory storage module is particularly advantageous. Basically, and without explaining both the invention of U.S. patent application Ser. No. 596,206 and the presently disclosed invention, the interaction between any, prior art or not, priority determination within the "front" end of a memory resource and the action of the present invention to distribute data within the "back" end of the same resource is as follows. If the priority system within the "front" end of a memory resource is able to prioritize a large number of requestors (e.g., ten) by classes or parts (e.g., a first class of one time critical requestor member plus a second class of one time critical requestor member plus a third class of four requestor members plus a fourth class of four requestor members) then, by definition, only one requestor within any of such classes or parts will be simultaneously serviced by the memory resource (e.g., four requestors, one from each class, can be simultaneously serviced). This means that at the very "back" end, output, data communication drivers which exist in sets (e.g., ten sets) for communication to each of the (ten) requestors, only one such set as is associated with one only requestor within a class of requestors, will be operative at any one time (e.g., only one set of four such sets serving the four requestor members of the third class could be operative at any one time). This means, still at the "back" end of memory, that one only data output register needs supply all the sets of data communication drivers as are associated with each class of requestors. The total data output registers (e.g., four such in service of four requestor classes) are the "destinations" to which the data simultaneously developed of the "sources (e.g., the eight memory banks of which maximally four only can be simultaneously accessed by requests of the four requestor classes) needs be distributed (e.g., data from eight sources (banks) of which four are active needs be distributed to four destinations (data outputs registers)). Now, of course, this required data distribution can be straight forwardly multiplexed (e.g., by four eight-to-one (8:1) multiplexers) as is taught in the prior art. Certain information, mainly that one only of the requestors within each requestor class will be simultaneously operative, exists upon the existence of prioritization by parts, however, so that the improved apparatus and method of the present invention, utilizing such information, may be particularly advantageous. Of course, in the degenerate case wherein each requestor class consists of but a single requestor, the apparutus and method of the present invention will still function.

Having dispensed with the somewhat complex concept that the prior art in establishing "priority" to concurrently "shared" memory stores, performed by circuitry within the "front" end of memory should have some bearing on the present invention of multiple output port memory storage modules, performed by circuitry within the "back" end of memory, it is also necessary to understand some prior art physical fundamentals of "banks" and "storage modules". Banks and storage modules, either or both, are likely to be modular replaceable units, such as on pluggable assemblies or printed circuit boards. Although some small quantum of additional room, in which logic circuits may be emplaced, may be present in a modular bank or storage module, it is not normally desired, either for maintainability nor for the economics of partitioning functionality across replaceable assemblies, to distribute the output logics and drivers, which may in aggregate be very extensive, of a shared access memory resource onto these banks and/or storage module assemblies. Indeed, the memory resource final output registers, drivers, and control logics are often themselves sufficiently extensive so that such are themselves distributed across plural pluggable assemblies or printed circuit boards. Within such a functional partitionment onto different physical assemblies, which partitionment is extremely common if not mandated for very large scale shared memory resources, the banks and/or storage modules are going to be at one physical place and the final output registers, drivers, and control logics are going to be at another physical place. The information communicatively distributed between these two places is data, and in very large scale shared memory resources operating at very high external communication bandwidths (e.g., in the range of 11.4 gigabits/second to aggregate requestors), the amount of this data is prodigious in both the bit widths of the communication and in the rates thereof. Very high rates imply communication which is costly in both the active elements and the communication channel medium. Very wide bit widths of communication imply large numbers of these expensive high performance communication paths. Obviously it thus becomes desirable to maximize the duty cycle, to attempt to obtain 100% utilization, of these numerous and costly data communication paths between the banks and/or storage modules which originate data and the final output registers and data drivers which are the (immediate next) destination of such data. Although organization of the distributive communication paths between memory resource banks and/or storage modules can be considered an issue of partitionment, and not of functionality, the organization of such communication to be from multiple output port storage modules in accordance of the present invention will generally permit that in actual, common, physically realizable partitionments of a memory resource the duty cycle over these numerous and costly distributive communication paths will be 100%, or twice that 50% duty cycle obtained by the full multiplexed solution of the prior art.

OBJECTS

A. General Objects

It is a primary general object of this invention to provide an improve high performance memory storage system accessible by one or more host data processors and one or supporting scientific processors. When such high performance storage unit memory resource is large and wide, on the order of 4,194,304 36-bit words, but remains fast, on the order of 133.33 megawords per second (4 words each 30 nanoseconds) on certain high speed ports with a total 11.4 gigabits per second bandwidth on all read data paths, while responding to a multiplicity of requestor-users of such memory, nominally ten, then there is considerable challenge presented in certain areas of the memory in obtaining high performance. One of these areas is the data transfer occurring between the simultaneously operative storage memory banks of the memory resource and those ports of the memory resource which do communicate to the appropriate requestors the data read of such storage memory banks. This path itself must sustain the nominal 11.4 gigabits per second throughput of the memory resource. Moreover, connections made in this area of the memory must connect a multiplicity of sources, nominally the eight storage memory banks, to multiplicity of output ports, nominally of four major types as sustain of communication to a nominal ten requestor-users of four types. In order to sustain the nominal 11.4 gigabits per second bandpass of the overall memory resource, each of these data paths connecting eight data sources (the storage memory banks) to four sinks of such data (the output ports of four types) must be four data words in width, or 144 data bits plus 16 accompanying parity bits. The number of communication lines, switched or unswitched, in the area of a memory obviously is extremely large. Furthermore, because 4,000,000+36-bit words of memory storage occupy considerable physical volume, these data paths are on the order of inter-module, or inter-p.c. card, wiring, and are of significant delay to electrical signal propagation thereupon. Movement of data along the multitudinous connective paths between the storage memory banks and the ports from which such data is output to requestor-users requesting same, although the times of such movement may be pipelined, does add to the overall response time of the overall memory resource to a user request thereof. It is the general object of the present invention that this communication path should be made as efficient, in terms of the amount and cost of interconnective circuitry utilized, and as fast as possible.

B. Specific Objects

It is the object of the present invention that voluminous amounts of data should be communicated on fast and efficient paths of a specific type, mainly wired-OR buses, from a multiplicity, nominally eight, of storage memory banks wherein such data arises responsive to read requests to a plurality, nominally four, of output ports of such memory wherein the data may be ultimately communicated to a multiplicity, nominally ten, requestors.

In realization of this object, it is a first specific object that each of the nominal eight storage memory banks, and each of the nominal four storage modules within each such storage memory bank, should be possessed of a plurality, nominally four, output ports. Upon one only of such nominal four output ports will be a storage memory bank, acting through the storage module components thereof, emplace the data resultant from any single read operation. Therefore it is necessary to the realization of this first specific object that a manner and apparatus for the control of storage memory bank to emplace the data read thereof upon a single one of a multiple of output ports from and of such storage memory banks, and from and of the storage modules contained therein, should be taught. Such control of the storage memory banks, and of the storage modules contained therein, will basically be derived from the prior prioritization of that request which the storage memory bank has serviced by reading data responsively thereto.

It is a second specific object of the present invention that like ones of the nominal four output ports of the storage memory modules, and of the storage modules contained therein, should be connected amongst and between the nominal eight storage memory banks, containing a nominal four storage modules, each in a wired-OR, bussed, fashion. In order that data communication thereupon such wired-OR buses, nominally four in number, should be unambiguous it is necessary that only one of all the nominal eight storage memory modules should emplace output, read, data upon one of the wired-OR communication buses at any one time. This will be seen to be accomplished in the present invention by the mode and manner of the prioritization, and of the requesting, of the reading of data by the concurrently operative storage memory banks.

Finally, it is a third specific object of the present invention that each of a nominal four output ports should connect to the entire, nominal four, wired-OR communication buses for the receipt of data from one such at any time. Consequently, it is necessary to control these nominal four types of ports which are the output ports of the overall memory resource each to selectively gate the contents of one only of the nominal four wired-OR communication buses, which wired-OR communication buses are carrying that data currently read of one storage memory banks responsively to the request of a requestor which will receive the data read through the associated type of output port. Although each of the nominal four types of output ports does connect but once to each of the nominal four wired-OR memory buses, and does receive read data upon only one such at one time, such data may be further multiplexed within the output memory port of a certain type to be distributed to a single one of up to a nominal four requestors communicative on the output port of that certain single type. It is thusly necessary that each output port of each certain type be controlled to firstly accept data from the appropriate one of the nominal four wired-OR memory buses, and that such output port of a certain type be further controlled to ultimately disseminate the read data to the single appropriate requestor. Such control will later be seen to be primarily dependent upon the address of the data.

SUMMARY OF THE INVENTION

A. General Function of the High Performance Storage Unit Within Which the Present Invention Resides The digital data processing system within which the present invention resides includes one or more host processors each coupled to one or more high performance storage units, or memory resources. Host processors can be selected from units available commercially, where the 1100/90 System available from Sperry Corporation is found to be particularly advantageous.

The High Performance Storage Unit (HPSU) within which the present invention resides is unique, being basically a memory unit capable of coupling to various pluralities of instruction processors, and input/output units as well as to a pair of Scientific Processor (SP). Since each HPSU is directly connected to the input/output units and the instruction processors of the host system, it is an inherent part of the host data processing system. On the other hand, since it is also directly connected to the Scientific Processor, it is also its main storage system. Because of its novel properties, it is able to interface both with the host system and the Scientific Processor without the resulting "bottleneck" of past scientific data processing systems.

When more than one HPSU is desired to provide additional storage capacity, a Multiple Unit Adapter (MUA) is utilized between each Scientific Processor and multiple High Performance Storage Units. Generally, the MUA is an interface unit which couples a single Scientific Processor through the use of a single Scientific Processor port to a plurality of up to four HPSUs via four HPSU ports. In this manner a Scientific Processors may address, read and write any location in any of the HPSUs.

The MUA is used in a scientific data processing system to interface at least one scientific Processor to a plurality of High Performance Storage Units. The use of a separate MUA in such a data processing system enables the Scientific Processor of such a system to have a single HPSU port to thereby reduce the cost of the Scientific Processor when a single HPSU is desired to be used in the system. This MUA is required only when more than one HPSU is used in the scientific data processing system, thereby providing the additional memory interfaces needed for the Scientific Processor.

The Scientific Processor (SP) used herein is a special purpose processor attached to the host system via the HPSU(s). It is optimized for high speed execution of floating-point vector arithmetic operations. The SP provides increased performance for both integer and floatingpoint scalar operations that are embedded in the vectorized code to thereby provide overall increased performance for scientific vector FORTRAN programs.

B. Function of the Present Invention of Multiple Output Port Memory Storage Modules The present invention is a means and an apparatus for the transferance of data between the storage memory banks and the memory resource output ports, which area is commonly called the "back" end of a memory, within a very large high performance memory, called a High Performance Storage Unit (HPSU). Data transferred by the apparatus and method of the present invention originates in storage memory banks, nominally eight in number, which are independently responsive to requests and addresses received by each to read data stored therein. Each of the storage modules, and the storage memory banks resultant therefrom, has a plurality of storage memory bank output ports, nominally four in number, to which is selectively gated read data, such read data being selectively gated to one only of such storage memory bank output ports.

The corresponding relative ones (of the nominal four) of the output ports of each storage module (and of the storage memory banks comprised thereof) are wired-OR connected into a communication bus, ergo a nominal four such wired-OR communication buses exist. Each of the nominal four wired-OR communication buses communicates to a major, external world output port of the overall memory resource, through each which such memory resource output port the memory resource will communicate the data read of the storage memory bank to one or more requestors.

The terminology "memory resource output ports", being the I/O ports of the HPSU, and the terminology "storage memory bank output ports", being the portals of the storage memory banks (and of the storage memory modules of which such storage memory banks are constructed) will be recognized to be referring to separate entities.

Since the transference of data from the storage memory banks, nominally eight in number, to the major output ports, nominally four in number, of the storage memory resource is by wired-OR bus means, conflict must be prevented wherein more than one of such storage memory banks would attempt to communicate read data upon the same wired-OR bus at the same time. This is accomplished by a priority scheme which assures that a maximum of one only of the storage memory banks will be reading data to any one of the four wired-OR buses at any one time. Since the nominal four wired-OR communication buses are in one-to-one correspondence with the nominal four memory resource output ports, this relationship is tantamount to saying that a maximum of four of the storage memory banks will be simultaneously operative, each reading data responsively to the requests arising from, and sending such data, to requestors respectively associated with each of the four memory resource output ports.

It is also necessary not only that will no greater number of the storage memory banks simultaneously read data than exist wired-OR communication buses to distribute and communicate such data, but also that each reading storage memory bank will be directed as to upon which single one of the nominal four wired-OR communication buses respectively connecting to the nominal four storage memory output ports of such storage memory module the read data should be emplaced. This output gating control of the storage memory banks is accomplished by the same priority which did gate of the read request to such banks, and which did establish that a maximum four banks would simultaneously read data to the four wired-OR communication buses as are associated with the memory resource output ports. The priority and gating control in combination establish that no more than one simultaneously read data quantity will be transmitted per for wired-OR communication bus to a respective memory resource output port upon each read cycle.

As a first enhancement to the present invention, it is established that the wired-OR communication buses which do normally each respectively electrically connect in common the respective storage memory output ports at each of all the storage memory banks (and of the storage memory modules of which such storage memory banks are constructed) should, instead, electrically connect in common the respective storage memory output ports at each of only some of the storage memory banks, the number of such wired-OR communications buses being increased until, in aggregate, the respective storage memory output ports of each of all the storage memory banks are connected. In the preferred embodiment enhancement, a first wired-OR communication bus connects to a respective n'th one storage memory output ports at exactly one-half, called the even ones, of the storage memory banks while a second wired-OR communication bus connects to the same respective n'th one storage memory output pports at the remaining one-half, called the odd ones, of the storage memory banks. Now both the first wired-OR communication bus and the second wired-OR communication bus are uniquely associated with one only of the memory resource output ports (as was the single wired-OR communication bus which such first and such second bus, in combination, replace as an enhancement). When there was one only wired-OR communication bus associated with each one of the memory resource output ports, no logical gating of such single wired-OR communication bus was required. When, as an enhancement, the single wired-OR communication bus is physically split into two halves, a first and a second wired-OR communication bus, then the memory resource output port must be controlled to logically gate one only of the two halves, only the first or only the second wired-OR communication bus, at any one time. This is simply accomplished by logical gating control derived from the address of the read data which is being gated, such read data coming from either the even address ones of the storage memory banks or the odd address ones of the storage memory bank.

As a second enhancement to the present invention, consider that any wired-OR communication bus (be it across like output storage memory ports of all of the storage memory banks, or of half of the storage memory banks, or whatever), carrying as it does many signal lines, should be considered to be divided into groups of such signal lines. In the preferred embodiment there are two such groups on some of the wired-OR communication buses: a first group of words 0 and 1 (plus accompanying parity bits) read from the storage memory banks, and from the word 0 and word 1 storage modules contained therein, called the Lower group, plus a second group of words 2 and 3 (plus accompanying parity bits) read from the storage memory banks, and from word 2 and word 3 storage modules contained therein, called the Upper group. This second enhancement allows that a memory resource output port need not take the entire signal lines (four data words plus accompanying parity bits) of a wired-OR communication bus, but may instead logically gate only the Lower Group or the Upper Group. This requires logical gating control, which gating control is again derived from the address of that read data which is being gated. This time the address bit of interest is that which discriminates between a Lower two words or an Upper two words within each addressable boundary of four total words.

As a third enhancement to the present invention, some ones (nominally two) of the major memory resource output ports (nominally four to which the data read of storage memory banks (nominally eight) is carried by wired-OR communication buses (nominally four), may themselves communicate with a plurality of individual requestors, nominally four in number. Therefore, these certain ones of these major output ports of the memory resource must be further controllable to selectively gate that data received of the wired-OR communication buses for transmission to a selected one of the requestors connected thereto such major output port, which such requestor is, of course, that one which did originally give rise to the request of a storage memory bank which resultantly gave rise to that data quantity which now needs be transmitted. This control is basically derived from a combination of the prioritization of such plurality of requestors into the major memory resource communication port, in combination with the addressing of such requests received of such plurality of requestors. The present invention of wired-OR communication of data read of multiple output port storage modules, a nominal four such modules in aggregate forming a multiple output port storage memory bank, via wired-OR communication buses to major memory resource output ports is fully compatible that one or ones of such memory resource output ports should be further multiplexed to serve a plurality of requestors communicative therewith.

The total bandpass of the combined wired-OR communication channels of the present invention is very high, on the order of 11.4 gigabits per second. To distribute data at these rates between a multiplicity of sources, a nominal eight storage memory banks, and a plurality of sinks, nominally four memory resource output ports, requires both high technology and architectural refinement. Even if parallel communication paths operative at the speed of light are utilized for the necessary data distributions occurring between the sources and sinks, when such data is derived from addressable memory stores on the order of 4,000,000 36-bit words, then such physical communication paths will have lengths in the order of meters and incur delays in the order of tens of nanoseconds, which delay is significant to the overall performance of a high performance memory. Large numbers of high performance communication paths used in the distribution of data between sources and sinks are also costly. The present invention is an architectural refinement in the "back" end of memories, which invention is applicable to diverse technologies. The architectural refinement of the present invention basically teaches that, in consideration of the read/write cycle time of storage memory banks and of the interface cycle times of various requestors, it may be possible to create a wired-OR bus communication scheme between the memory stores and the output ports of a memory resource, which wired-OR communication scheme will be of high performance and minimum cost. Such a wired-OR bus communication scheme requires multiple output port storage memory banks, and multiple output port storage memory modules within such storage memory banks.

BRIEF DESCRIPTIONS OF THE DRAWINGS

FIG. 1, consisting of FIG. 1a through FIG. 1c, must be viewed in two combinations: FIG. 1a in combination with FIG. 1b show a prior art system for the multiplexing of data developed in storage memory banks to memory resource output ports, whereas FIG. 1a in combination with FIG. 1c is a general representation of the method and apparatus of the present invention for the wired-OR communication of data between storage memory banks and memory resource output ports.

FIG. 2, consisting of FIG. 2a and FIG. 2b, shows a block diagram of the High Performance Storage Unit within which the present invention resides.

FIG. 3 shows a block diagram of the multiple output port storage module of the present invention.

FIG. 4, consisting of FIG. 4a and FIG. 4b, shows a diagram of the manner and apparatus by which the memory resource output ports of the High Performance Storage Unit of the present invention may be controlled to gate data received of the wired-OR communication buses, and to gate such data to be transmitted to one of the requestors with which such memory resource output port communicates.

DESCRIPTION OF THE PREFERRED EMBODIMENT

A. Conventions

Figure 1A:
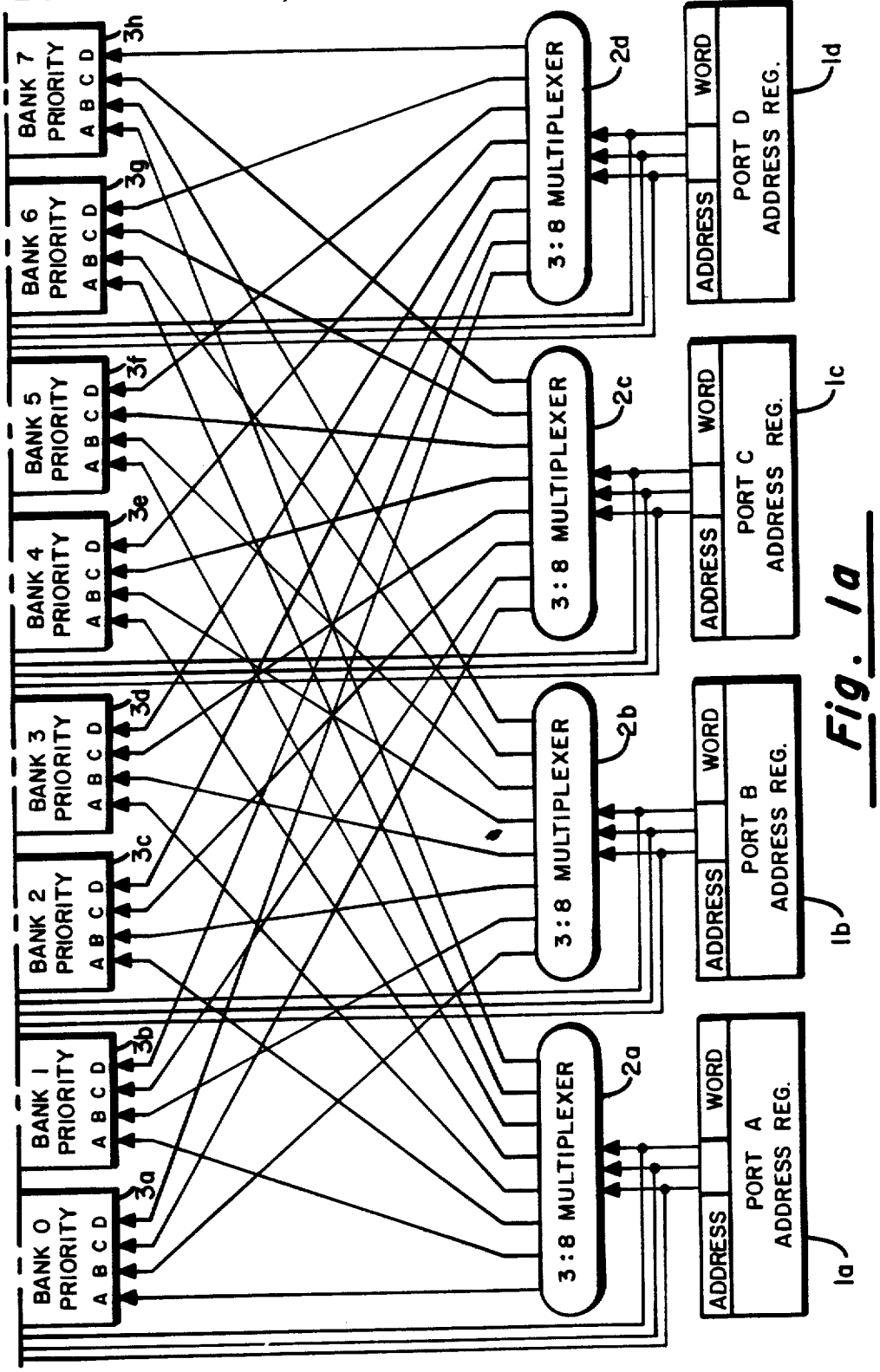

Throughout the following description and in the accompanying drawings there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor, a group of parallel conductors, or a general path of data for control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art as they require no additional explanation.

For purposes of discussion of specific logic block diagrams or functional logic circuits, it is convenient to have a reference of signal levels. For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated I, and the like, the designations within the block symbols of the respective functions is readily understandable to those skilled in the art. More complex macro logical functions, for example multiple input Exclusive-OR, designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half- arrowhead indicates that the response is to a Low signal. Accordingly, if an AND circuit (A) is represented having two or more closed half-arrowheads at the input, it will indicate that the AND function is on High signals and will be satisfied only when all input lines receive High signals. In a similar manner, if an A symbol is illustrated having two or more open-arrowhead inputs, the function designated is that of Low AND, and will be satisfied only when all inputs are Low. It is apparent that this Low AND function is logically equivalent of an High OR function. In a similar fashion, the half-arrowhead convention is applied to define output relationships.

In physical construction of circuits to implement the designated logic functions, it is not uncommon to provide signal inversion in conjunction with the combinatorial logic function. In such cases, the fact of inversion will be designated by the state of the half-arrowhead on the output line or lines. In this way, it will be understood that a Low AND circuit having two or more open half-arrowhead inputs will provide a Low output signal at the open half-arrowhead output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking, the right-most half-arrowhead in the symbolic representation will be considered as the true output and will define the function of the element, and the left-most half-arrowhead will be considered as the complement thereof. For example, an A symbol having two or more closed half-arrowhead inputs and a right-most closed half-arrowhead would normally indicate an AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various types of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function and the symbol having a curve at the input and the curve pointed output, often referred to as the "shield" symbol, represents circuits that perform the logical OR function. For the AND function the straight line input or the dot, represents a High AND, and results in a High output signal when all input signals are High. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

Concerning certain further conventions in nomenclature, when referring to address range or to storage size, the multipliers K and M are equal to 1024 and $1024^2$ respectively in this document. Therefore, 65,536 and 16,777,216 are indicated as 64K and 16M respectively.

It will later be seen that the High Performance Storage Unit (HPSU) within which the present invention resides communicates with requestors of multiple types across data transfer interfaces, or ports, which are not of uniform bit widths. In the measurement of such bit widths, a "word" is defined as 36 data bits. Nominally, 4 parity bits will accompany each such word. Therefore it should be considered that the "word" plus accompanying parity bits will, in aggregate equal 40 bits. Such a "word", actually an externally communicated data quantity, is to be distinguished from those internal "storage data words" of the present invention which are pertinent to the preferred mode of storing a "word" within the memory stores of the HPSU. Such "storage data words" are also defined to be 36 bits in width, the same 36 bits as are elsewhere called a "word". A "storage data word" will be accompanied, however, by 8 bits of a combination error correction and parity code similarity to the teaching of U.S. Pat. No. 4,345,328 for ECC Check-Bit Generation Using Through-Checking Parity Bits to B. D. White. Therefore it should be considered that the "storage data word" plus an accompanying combination error correction and parity code will, in aggregate, equal 44 bits. The pertinent concept is that when a "word", or a "storage data word" is mentioned then such always contains 36 bits of data but may also be accompanied by additional error syndrome bits within different areas of the High Performance Storage Unit (such as the interface and the memory stores of the HPSU), which aggregate bits do establish the bit-widths of various flow paths within the machine. For example, in that continuing discussion of conventions proceeding in the immediately next following paragraph, the reader will recognize that the "pair of 36-bit words" therein discussed could actually occupy a bit-width of 2×40 at the interface to the HPSU, or a bit-width of 2×44 within the memory stores of the HPSU. Similarly, when a "72-bits" interface is being talked about, the reader will recognize that the "72-bits" are of two 36-bit words of data, which will normally occupy a bit-width of 2×40 bits at the interface to the HPSU.

It will additionally be later seen that the HPSU communicates with requestor types which are nominally identified as Instruction Processor (IP's), Input/Output Processors (IOP's), and Scientific Processors (SP's). An IP/IOP storage data word consists of an even and odd address pair of 36-bit words with the even address being smaller than the odd address. The even address is the most significant word (MSW). The interface is 72-bits wide where bit 0 (MSB) and bit 36 correspond to storage bit 0 of the even and odd word respectively. An SP storage data word consists of four consecutively addressed 36-bit words on four word boundaries. The interface is 144 bits wide.

The HPSU stores and reads words as received. Odd and even words cannot be swapped at the HPSU level.

In fields where bit position represents significance, the MSB is drawn as the leftmost bit and is numbered as the lowest number in the field.

B. General Principles of the Invention

Figure 1B:
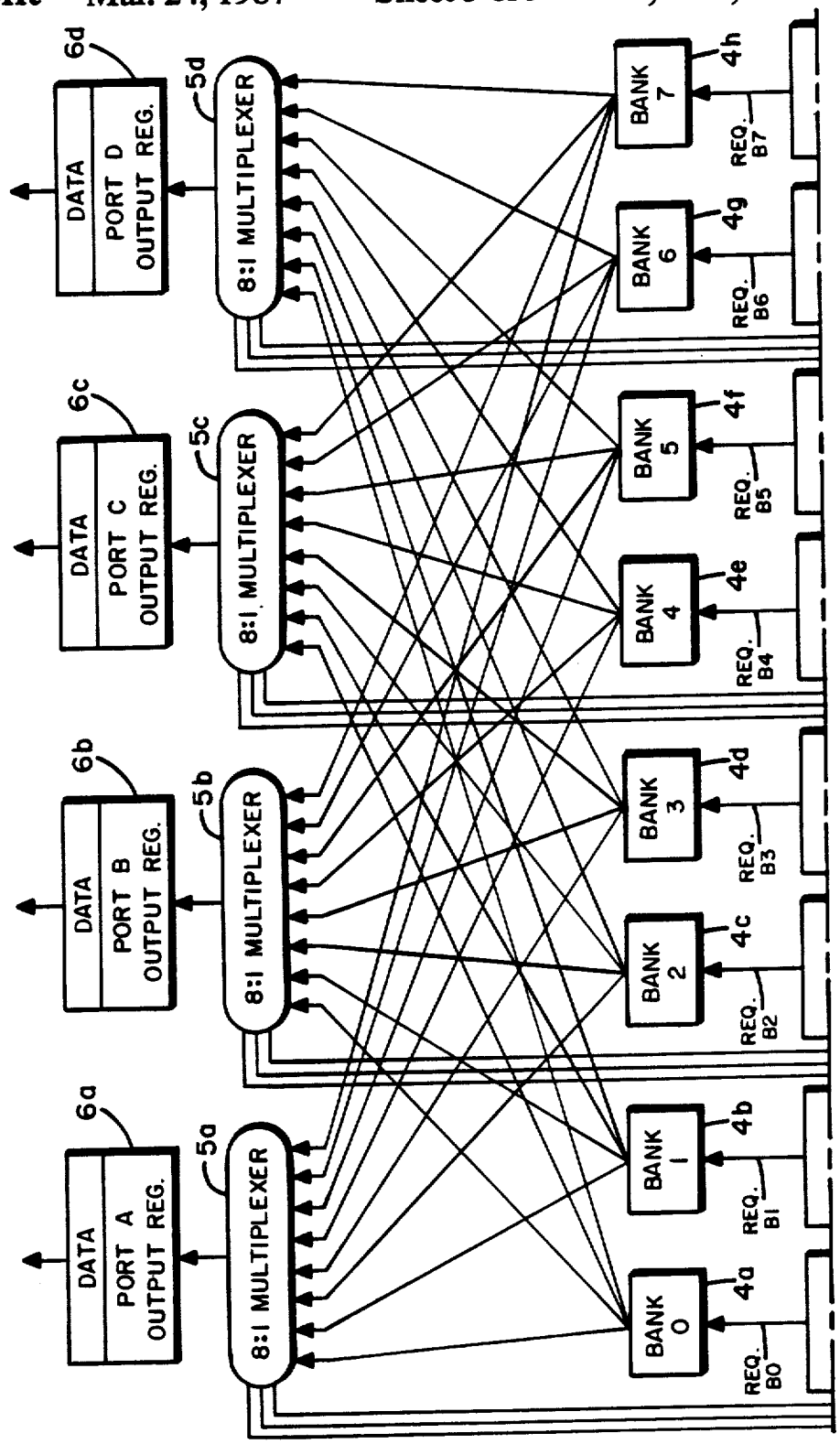

The present invention is an improved method and apparatus for the simultaneous movement of data read simultaneously from a number of independently and concurrently operative storage memory banks to a number of memory resource output data ports, which memory resource output data ports do interface all such storage memory banks to those requestors which make read and write requests of the data stores of such storage memory banks. A prior art representation of a large scale memory, including that data distribution and transfer just described, is shown by FIG. 1a in combination with FIG. 1b, showing in such combination a prior art structure. Addressing requests from requestors (not shown) consisting of ADDRESS plus possible data, or WORD, are received (paths not shown) into four memory resource interface port address registers, PORT A ADDRESS REG. 1a through PORT D ADDRESS REG. 1d. Three binary bits of each such address as held within each of the four address registers PORT A ADDRESS REG. 1a through PORT D ADDRESS REG. 1d are respectively transferred to multiplexers 3:8 MULTIPLEXER 2a through 3:8 MULTIPLEXER 2d wherein such three bits are decoded to make requests to one of eight memory banks, BANK 0 4a through BANK 7 4h. The up to four requests for reference to a single memory bank as are associated with the A, B, C, and D ports are prioritized in bank priority for each port, BANK 0 PRIORITY 3a through BANK 7 PRIORITY 3h. The highest priority pending requests, requests on port A being of higher priority than requests on port B being of higher priority than requests on port C being of higher priority than requests on port D, is transferred from the bank priority, BANK 0 PRIORITY 3a through BANK 7 PRIORITY 3h, as the memory request signal, respective signal REQ. B0 through signal REQ. B7, to the respective eight memory banks, BANK 0 4a through BANK 7 4h.

The read data output of each such bank, which read data may be simultaneously output if the banks were simultaneously requested, is transferred through a single storage memory output port at each such storage memory bank via respective multiplexers 8:1 MULTIPLEXER 5a through 8:1 MULTIPLEXER 5d to the memory resource output ports A through D. The same three binary bits of addressing information as supplied from the port address registers, PORT A ADDRESS REG. 1a through PORT D ADDRESS REG. 1d, to the 3:8 MULTIPLEXERs 2a through 2d to allow selection of a storage memory bank is additionally respectively supplied to 8:1 MULTIPLEXERs 5a through 5d wherein it allows of the selection of data from the appropriate memory bank, BANK 0 4a through BANK 7 4h. The appropriate data read responsively to the prioritized requests at each of the storage memory banks is gated to the memory output registers, wherein it is gated as DATA from the PORT A OUTPUT REG. 6a through the PORT D OUTPUT REG. 6d. It will be understood that all of those connective flow paths shown in FIG. 1a in combination with FIG. 1b may be simultaneously active, and that, conflicts in addressing and priority permitting, the memory resource will be servicing requestors upon each of the four memory resource ports with respectively requested data read of each of the eight storage memory banks in a substantially parallel and simultaneous manner. Additionally, the memory structure shown in FIG. 1a in combination with FIG. 1b may be pipelined so that the times of the receipt of successive requests, the distribution of such requests to bank priority, the prioritization of such requests, the reading of storage memory banks responsively to such requests, the transference of data from storage memory banks to appropriate memory resource output ports, and the outputting of data read responsively to each request may be transpiring substantially overlapped in simultaneous time.

Concerning particularly the present invention, the prior art structure shown by FIG. 1a in conjunction with FIG. 1b may be generally considered to show of the multiplexing of requests (and of data, if data is to be written) arising at a plurality of memory resource ports, nominally four, to be simultaneously acted upon by a multiplicity of memory banks, nominally eight in number, with the read data results thereof such requests multiplexed (or demultiplexed) to be again distributed upon such plurality of memory resource ports. The connection between the storage memory banks, BANK 0 4a through BANK 7 4h and the multiplexers of the four memory resource output ports, 8:1 MULTIPLEXER 5a through 8:1 MULTIPLEXER 5d, are as broad as the width of the data quantities transferable upon each read cycle time from such banks to such output ports. If such quantities are equal, for example, to 144 data bits plus 16 accompanying parity bits, then the connective paths shown in FIG. 1b represent numerous physical interconnections. If the addressable memory stores are large, such as on the order of 512K addresses contained within each of the storage memory banks, then such memory banks will occupy a certain volume, on the order of a cubic meter. The output registers which do communicate data upon the four memory resource ports are usually separately located from, and represent a physical terminus to, such volume of memory stores. Thus, the interconnective paths, representing numerous physical interconnections, do also represent electrical communication paths of nominal length on the order of one meter. Data transfer along such paths shown in FIG. 1b should be fast in order to not unduly slow the response time of the overall memory resource (and may even be a particularly time consuming activity within the memory resource even when the various separable activities thereof such resource are pipelined). Great multitudes (on the order of 8 times 160 bits) of fast (on the order of 22.5 nanoseconds) electrical paths of nominal length one meter are significantly costly to physically fabricate and to power the driving of signals thereupon. The present invention is concerned with an alternative method and apparatus for the transference of data between a multiplicity, nominally eight, of storage memory banks and a plurality, nominally four, of storage memory resource output ports.

Figure 1C:
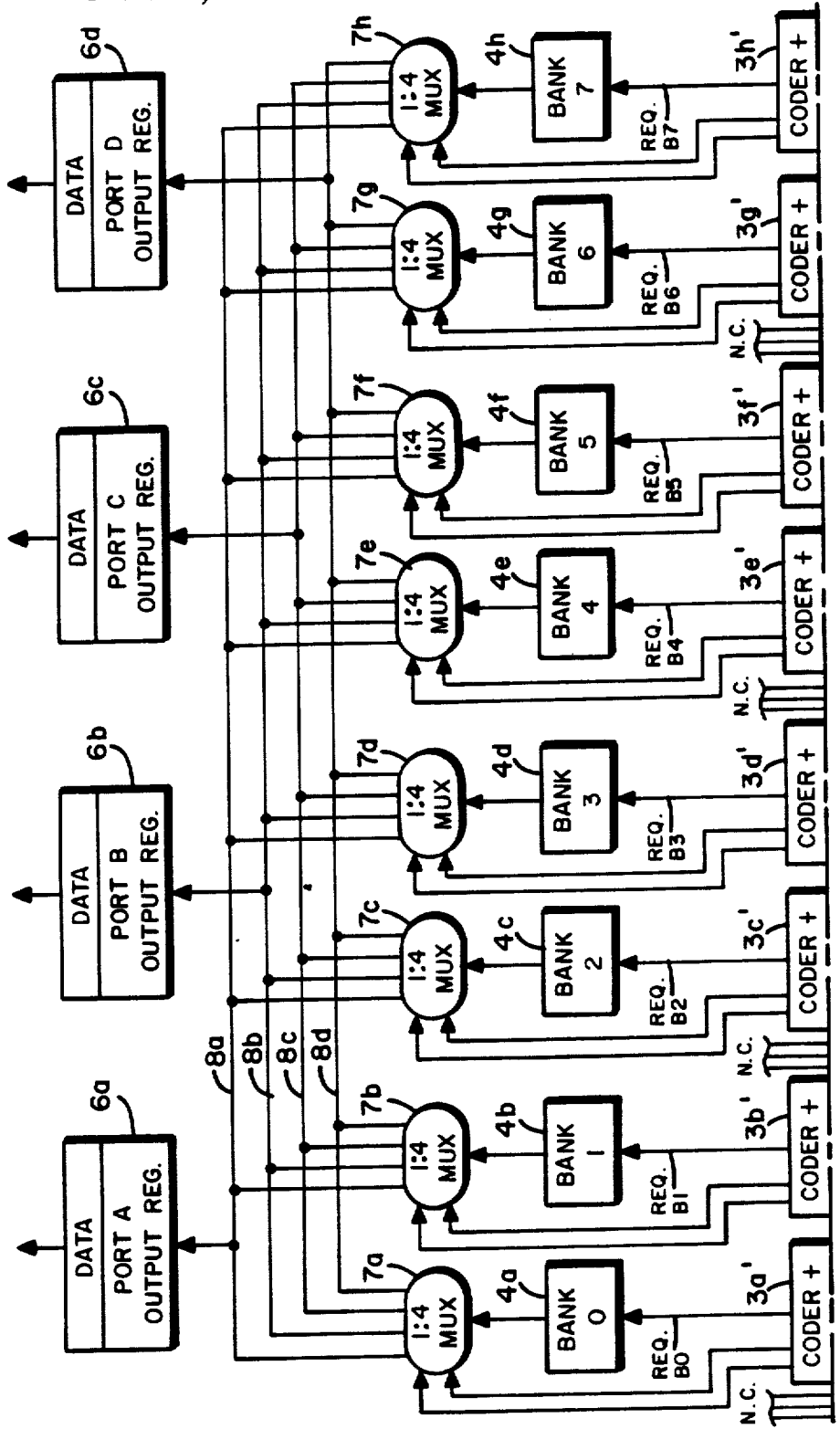

The principles of the present invention are shown in the block diagram consisting of FIG. 1a in combination with FIG. 1c. The bank priority, previously seen as BANK 0 PRIORITY 3a through BANK 7 PRIORITY 3h when FIG. 1a was viewed in combination with FIG. 1b, are now expanded to include a coding section, ergo now CODER +BANK 0 PRIORITY 3a' through CODER+BANK 7 PRIORITY 3h'. Each coder and bank priority operates as before to prioritize from amongst up to four competing requests (arising at four memory resource ports) for access to a single memory bank the one highest priority such request, which request is respectively transferred as signal REQ. B0 through signal REQ. B7 to respective memory banks BANK 0 4a through BANK 7 4h. Additionally however, the coder and bank priority provides of a two binary bit signal, which two bits represent the binary encoding of whether priority was granted to a requestor upon the A, B, C, or D port, to the output multiplexers of the memory banks, 1:4 MUX 7a through 1:4 MUX 7h. The data output of each of the memory banks, BANK 0 4a through BANK 7 4h, is selected within these output multiplexers (which should be considered to be integral with such memory banks), respective output multiplexer 1:4 MUX 7a through 1:4 MUX 7h, to be gated on to a one of four wired-OR communication buses, communication bus 8a through 8d. Since at any one time the bank priorities in aggregate did resolve amongst the maximum of four requests, one associated with each of the A, B, C, and D memory ports, which were simultaneously active, then a minimum of one and a maximum of four of the storage memory banks may be simultaneously requested, and resultantly to such simultaneously requests will later simultaneously provide of the respective data read responsively thereto such requests. The read data simultaneously provided by a maximum of four memory banks will be gated through the 1:4 MULTIPLEXERs at the output of each such bank to the appropriate respective one of the four wired-OR communication buses 8a through 8d. When each of the maximumly four memory banks simultaneously supplying read data is doing so responsively to a request arising at a different port of the memory resource, then no conflicts in the utilization of wired-OR communication buses 8a through 8d will exist, and a maximum of all four such buses will be simultaneously active. The data upon each such wired-OR communication bus 8a through 8d is recovered into the corresponding memory resource port output register and outputted as data to the requestor upon that memory resource port which did request of such data being read. Those particular three binary bits of the address word associated with each memory resource port held within PORT A ADDRESS REG. 1a through PORT D ADDRESS REG. 1d, which bits had previously been used to control multiplexing within the prior art scheme shown in FIG. 1b, are not connected (N.C.), nor utilized, in effectuating data transfer control with the "back" end of a memory resource utilizing applicants' apparatus and method. It will later be found, however, that it is possible to have more than one requestor hooked to each of the memory resource ports, PORT A through PORT D (the addressing requests input from which such memory resource ports are shown in FIG. 1a and the data output to which such memory resource ports are shown in FIG. 1c), in conjunction with the present invention. In such an expanded and compatible utilization of the present invention, there will be some multiplexing control applied to the output registers of those ports which do service multiple requestors. Such control, while based on a combination of priority and addressing, is not, however, developed from those particular three address bit lines coming from FIG. 1a and shown as not connected in FIG. 1c.

C. The Present Invention Resides in a High Performance Storage Unit (HPSU)

The present invention resides in, and is utilized in the functional performance of, a High Performance Storage Unit (HPSU) which is the subject of U.S. patent application Ser. No. 596,130, the entire contents of which are incorporated herein by reference. For the sake of completeness, certain of the description of such an HPSU is herein provided.

The HPSU resides in a digital data processing system which is essentially modular, and provides for parallel processing. Normally, from one to four Instruction Processors (IP0 through IP3) will be interfaced to the HPSU. Each IP can, for example, be a Type 3054-00 unit available from Sperry Corporation, or such other Instruction Processor available commercially as would be compatible. The IP provides basic mode and extended mode instruction execution, virtual maching capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control.

In conjunction with the IPs, from one to four Input/Output Processors (IOP0 through IOP3) are also normally interfaced to the HPSU. The interconnections between the IPs and the IOPs are in fact direct connections between each unit, and the interconnection is not bused. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs function as the system Central Processing Units, and the IOPs act as CPUs to handle all of the communications. The IPs and IOPs are commonly referred to as the 1100/90 system.

From one to four High Performance Storage Units (HPSU0 through HPSU3) can be utilized in a system. Each HPSU is a free-standing unit with eight memory banks, each bank containing 524K storage data words. Error Correction Code (ECC) is used internal to each HPSU to provide single-bit error correction and double-bit error detection.

Each HPSU provides four Instruction Processor (IP) ports for providing communication paths to the IPs, both for reading and writing. Again it should be understood that inter-connection between each HPSU and each IP is directly cabled, and is not bused. Each HPSU also includes four Input/Output Processor (IOP) ports for interconnection with the IOPs. These interconnections are direct cables between each HPSU and each IOP. The IP and the IOP ports are each two-word read and write interfaces, where each word contains 36 data bits and is accompanied by four parity bits. The IOP and IP interfaces operate on a 60 nanosecond interface cycle time.

Each HPSU also includes at least one Scientific Processor (SP) port, and in the embodiment of this disclosure has two such SP ports. Each SP port has a four-word data interface. If a single SP is used with a single HPSU, it may be coupled directly to the SP port of such HPSU. When two or more HPSUs are used with an SP, it is necessary to provide a Multiple Unit Adapter (MUA) for each SP. Regardless of whether or not interfaced through a MUA, each SP interface reads or writes four words, where each word contains 36 data bits and is accompanied by four parity bits, upon each interface cycle time of 30 nanoseconds.

Each SP functions under direction of one or more of the IPs to perform scientific type calculations in a support mode. In this regard, the IPs can be considered to be host processors and the SPs can be considered to be support processors, all operating through the common storage of the HPSU(s).

The overall system maintenance and supervision is accomplished through one or two System Support Processors which are connected to all units of the system. The SSP is available commercially and is utilized in the Sperry Corporation 1100/90 Systems. In general, it is understood that each SSP performs the function of a hardware maintenance panel for the system. The display and setting of information, the activation at most maintenance facilities, selecting modes of operation and the like, is done at the control section of the SSP.

A clock system is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock.

Intercommunication between units is essentially on a Request and Acknowledge basis, and the interfaces will be described in more detail as appropriate.

D. General Description of the HPSU

The block diagram of an HPSU within which the present invention resides is shown in FIG. 2, consisting of FIG. 2a and FIG. 2b. The HPSU is a storage device that is commonly accessible by the IPs, the IOPs, and the SPs via the MUAs. The various devices that can be coupled to the HPSU can have differing bit-widths of interface data transfer, and differing interface cycle times.

In the preferred embodiment, the HPSU utilizes eight Banks of storage devices, identified as STORAGE MEMORY 0 40a through STORAGE MEMORY 7 40h of which Banks 0 and 7 are illustrated. Though not specifically illustrated in FIG. 2, each storage memory Bank is comprised of four Memory Modules and each Bank has a total capacity of 524K storage data words. Such a word in memory is 36 data bits, and is accompanied by 8 bits which are utilized for Error Correction Code (ECC) check bits, and for parity bits. Each storage memory bank is arranged for receiving four words (W1, W2, W3, and W4), and for reading out four words upon each read/write cycle time.

The STORAGE MEMORY BANKS 40a through 40h include the addressing circuitry, the storage cells, the timing circuits, and the driver circuits, and can be constructed from commercially available components, it being understood that the accessing rate (read/write cycle time) must accomodate the interface rates (interface cycle times) with the attached units.

The wide lines indicate directions of data flow, and the single lines indicate control flow.

At the input, the HPSU has an IOP interface 202 which can accommodate up to four IOP units at the four IOP ports labelled IOP0 through IOP3. It also has an IP interface 203 which can accommodate up to four IPs at the four IP ports designated IP0 through IP3. The IOP ports 202 and the IP ports 203 each operate to receive two data words (if a write is directed) plus address, function, and start/end data using an interface clock cycle time of 60 nanoseconds.

The HPSU also has two input SP interfaces 200 and 201 which can accommodate two SPs at the two ports labelled SP0 and SP1. The SP input ports each function to receive four data words (if a write is directed) plus address and function data upon each interface cycle time of 30 nanoseconds.

The request and control signals from the IOP ports 202 are passed to the IOP PRIORITY 52, which functions to select the particular IOP to be given priority of access to the memory system. The selection is passed on line 54 to the IOP DATA MUX 56 which functions to select the appropriate data and address information to pass on line 58 to the BANK MULTIPLEXER 60i. The control signals provided on control path 62 drive the REQ DECODER 64 for selecting one-of-eight control lines 66 for providing control signals for making storage memory bank selection.

In a similar manner, the IP ports 203a provide request signals to the IP PRIORITY 68, which provides control signals on control line 70 to the IP DATA MUX-/STACK 72 for selecting the data and address signals that will be provided on path 74. Similarly, the control signals on lines 76 to the REQ DECODER 78 results in signals being provided to select one of eight lines 80 for controlling storage memory bank selection.

The two SP ports 200 and 201 are each arranged to store requests in REQ. STACK & CTRL 82, and in REQ. STACK & CTRL 84. Additionally to SP requests, SP data and address and function are temporarily held in SP0 DATA STACK 82 or SP1 DATA STACK 84 awaiting availability of the memory system. In essence, the SP0 stacks and the SP1 stacks are each a first-in-first-out (FIFO) circulating buffer. The request information feeds out of REQ. STACK & CTRL 82 on line 86 to the REQ. DECODER & SELECTOR 206 which provides a one-of-eight selection while data and address and function pass on line 204 to DATA SELECTOR 208 and then to BANK MULTIPLEXER 60i. Similarly, request information passes on line 94 from REQ. STACK & CTRL 84 to REQ. DECODER & SELECTOR 207 for making selections on lines 98, while the data and address and function passes on line 205 to DATA SELECTOR 209 and then to BANK MULTIPLEXER 60i.

The BANK 0 PRIORITY 60a through BANK 7 PRIORITY 60h each function to select between the IOP, IP, and the two SP requests presented to each for accessing memory. Each also functions to control the associated storage memory bank, STORAGE MEMORY BANK 0 40a through STORAGE MEMORY BANK 7 40h, to cycle and also to emplace data read upon one of the four storage memory output ports SP0, SP1, IOP, and IP of such storage memory banks, which storage memory output ports are respectively connected to SP0 wired-OR communication buses 213, to an SP1 bus (not fully shown) like buses 213, to an IOP bus (not fully shown) like buses 214, and to IP wired-OR communication buses 214.

The HPSU has an IOP output AND-OR/REG. 102c capable of handling the IOP memory resource port connection to four IOPs: IOP0 through IOP3. It also has an IP output AND-OR-STACK/REG. 102d capable of handling IP the memory resource port connection to four IPs labelled IP1 through IP3. Finally, it has SP output OR/REG. 102a and OR/REG. capable of handling the respective two SP memory resource output ports labelled SP0 and SP1. Data rates and timing at the output ports 224, 225, 226, and 227 are commensurate to those for the corresponding memory resource input ports previously described.

Each HPSU is assigned an address range of 4M 36-bit words. Each STORAGE MEMORY BANK 40a through 40h contains 512K words, and there are eight such banks within an HPSU. A bank is four words wide. Each bank operates independently of the other bank(s). Each receives request and output multiplexing control through the associated bank priority via a respective one of cables 210a through 210h, while receiving function plus start/end control (utilized in partial word operations) from the BANK MULTIPLEXER 60i via the respective one of cables 212a through 212h. Each receives data and address information from the BANK MULTIPLEXER 60i also via the respective one of cables 212a through 212h.

There are four storage memory output ports for each storage memory bank, consisting of one IOP, one IP, and two SPs (SP0 and SP1) output ports. All data read to any of the IOPs (0–3) is transmitted through the storage memory IOP port, and all data read to any of the IPs is transmitted through the single storage memory IP port at each storage memory bank.

That wired-OR communication bus 214, for example, does carry the data read to the IP memory resource output port and thence to any of the four IPs (IP0 through IP3) requires that the output register/drivers of such memory resource port, AND-OR-STACK/REG. 102d should be able to logically multiplex the read data received on bus 214 to an appropriate one IP. The AND-OR-STACK/REG. is controlled to do so by address signals (path not shown) received from the IP DATA MUX/STACK 72 and by priority port code signals (path not shown) received from IP PRIORITY 68. Likewise, the IOP memory resource port output register/drivers is controlled to logically multiplex data received upon a wired-OR communication bus to an appropriate destination IOP0 through IOP3 by signals received from IOP DATA MUX 56 and IOP PRIORITY 52 (paths not shown).

The HPSU provides a Dayclock, auto recovery timer, System Status register, maintenance exerciser, and an MCI interface. Odd parity is checked/generated across all interfaces for the IP's, IOP's, and SP's.

The function of the HPSU, including in the performance of the present invention, is discussed in greater detail in the next following section E.

E. Detailed Description of the HPSU Block Diagram

The block diagram of the present invention of a High Performance Storage Unit (HPSU) is shown in FIG. 2, consisting of FIG. 2a and FIG. 2b. The HPSU supports input and output interfaces to and from ten requestors: from and to Scientific Processor 0 (SP0) respectively across cables 200 and 224, from and to Scientific Procressor 1 (SP1) respectively across cables 201 and 225, from and to four Input Output Processors (IOP 0–IOP 3) respectively across cables 202 and 226, and from and to four Instruction Processors (IP4–IP7) respectively across cables 203 and 227. The HPSU contains eight storage memory banks, STORAGE MEMORY BANK 0 40a through STORAGE MEMORY BANK 7 40h, each containing 512K words for a total of 4M 36-bits words of memory storage. Remaining parts of the HPSU shown in FIG. 2 are the data and control paths, and the logic structure, which does support of the interface of the ten requestors to the eight storage memory banks.

Considering first the data interfaces to the Scientific Processors—the data input from SP0 via cable 200b and output to SP0 via cable 224 plus the data input from SP1 via cable 200b and output to SP1 via cable 225—such interfaces are uniformly four data words in width. Such four data words are transferable, bank priority conflicts and pending requests permitting, at an interface cycle time of 30 nanoseconds. Additionally received upon cables 200b and 201b, respectively from SP0 and SP1, is addressing and function information. There are 144 data lines in cables 200b and 201b plus 16 accompanying parity bits. There are also 6 function/write enable lines plus accompanying 1 parity bit. These 6 lines consist of 2 lines (2 bits) for function and 4 lines (4 bits) for the master word write enables (corresponding to the 4 words) plus 1 accompanying parity line (bit). There are also 22 address lines (allowing addressing at four-word boundaries within the collective storage memory banks, STORAGE MEMORY BANK 0 40a through STORAGE MEMORY BANK 7 40h. The requests of the HPSU by respective SP0 and SP1 is carried on respective interface communication lines 200a and 201a. The output cables 224 225 carry four words or 144 bits of read data, plus 16 parity bits.

Continuing in FIG. 2 with the interfaces to the HPSU, the HPSU supports of four "data" interfaces from and to four IOP's, IOP0 through IOP3, on respective cables 202b and 226. The interface to each IOP is two 36-bit words in width. Such two words may be transferred to such IOP's collectively at rates as fast as two words each 120 nanoseconds, and to an individual IOP at a rate of two words per 300 nanoseconds. Such slower rate to an individual IOP exists because of communication times across the interface. There are 72 data lines plus 4 accompanying parity lines in each of the cables 202b as receive communication from each IOP. There are additionally 25 address lines plus an accompanying 3 parity lines within the cables 202b communication path from each IOP. The greater number of address lines (25) upon the IOP ports than upon the SP ports (22) allows of addressing at the word boundaries within the collective storage memory banks. Finally, each IOP interface upon cables 202b carries 5 function lines plus an accompanying 1 parity line, and 12 lines carrying the start/end bits plus an accompanying 2 parity lines. The request signals from each of up to four IOP's are received via a dedicated line for each upon cable 202a. Each of the output cables 226 to each of the four IOP's carries 72 bits of read data, plus an accompanying 4 parity bits, on 76 total lines.

Likewise to the interface to the IOP's, the HPSU block diagrammed in FIG. 2 supports of an interface to four Instruction Processors, or IP's: the receipt of data and address and function and start/end information from the IP's which transpires on cable 203b, the receipt of requests from the IP's which transpires on cable 203a, and the issuance of data to the IP's which transpires via cable 227 The width of each data transfer is two words. The rate of data transfer may be as great as eight words per 240 nanoseconds for the IP's collectively during the block read operation thereto. For normal, non-blocked, read, the data transfer rate is identical to the IOP's at two words per 120 nanoseconds collectively. Again, the maximum data transfer rate to a single IP is two words per 300 nanoseconds, the lesser rate being due to the fact that multiple requests are not stacked (as will be seen to be the case for the SP's) and the interfacing time required to transmit an acknowledge from the HPSU to an IP, to process such within an IP, and to transmit a subsequent request to the HPSU. The number of signal lines and accompanying parity lines, within those cables 203a, 203b, and 227 of interface to the four IP's are identical to the numbers of lines within those corresponding cables 202a, 202b, and 226 of interface to the IOP's. In summary, there exists two SP ports each with a width of four data words, four IOP ports each with a width of two data words, and four IP ports each with a width of two data words in data communication between requestors and the HPSU.

Continuing in FIG. 2 with the explanation of the communication path to a Scientific Processor (SP), the data received upon such SP port is stacked in a 9-deep stack, the SP0 DATA STACK 82 or SP1 DATA STACK 84. Within these 9 locations for stacking data to be written within the HPSU, up to 8 may be filled at any one time with the remaining, 9th, left open. The ninth location is left open to augment performance in accordance with the teaching of U.S. patent application Ser. No. 596,203. Stacking of functions and addresses is also done on the Scientific Processor ports, such stacking as is additionally done in the structures labelled SP0 DATA STACK 82 and SP1 DATA STACK 84. The stacking of functions is in the 9-deep arrangement, but the address stack actually consists of two 4-deep address stacks without a ninth location. Such address stack, as well as the data and function stack, are controlled by the pending requests respectively held eight deep in REQ STACK & CTRL 82 and REQ STACK & CTRL 84 for the respective SP0 and SP1 ports. The splitting of the address stack into two 4-deep halves is made so that the decoding of the address of a next uppermost pending request may be made before an acknowledge is received for that current request which is outstanding, i.e., which has been issued to the memory banks for service thereupon. The mode and manner by which requests, addresses, and data may be stacked in a pipeline in order to expedite the communication thereof from a requestor SP to the HPSU is contained within aforementioned U.S. patent application Ser. No. 596,263 for a HIGH PERFORMANCE PIPELINED STACK WITH OVER-WRITE PROTECTION to Michaelson, the contents of which are incorporated herein by reference.

Continuing in FIG. 2, and recalling that the up to eight addresses as are stored in each of SP0 DATA STACK 82 and SP1 DATA STACK 84 are split into two half-stacks, called the odd stack and the even stack, so that a performance increase may be registered with the advance translation of such addresses immediately upon the issuance of an acknowledge, such addresses are passed by twos, one address associated with odd stack and called the odd address (although this means nothing as regards the actual location within the storage memory banks to be addressed) and another address associated with the even stack and called the even address, across cables 204 from SP0 Data Stack 82 to REQ DECODER & SELECTOR 206 in the case of SP0 interface, or across the two halves of cable 205 between SP1 DATA STACK 84 and REQ DECODER & SELECTOR 207 in the case of the SP1 interface. The stacked requests of REQ STACK & CTRL 82 for the SP0 interface are also received at the REQ DECODER & SELECTOR 206 via line 86, while the stacked requests of REQ STACK & CTRL 84 for the SP1 interface are received at REQ DECODER & SELECTOR 207 via line 94. The actual address bits received at the REQ DECODER & SELECTORS 206, 207 are four in number: address bits 2, 19, 20, 21 of which bits 2, 20, and 21 are utilized for four-bank interleave and of which bits 19, 20, and 21 are utilized for eight-bank interleave. Specifically, those address bits 2, 20, and 21 (or 19, 20 and 21) as are involved in bank selection do allow that the REQ DECODER & SELECTOR 206, 207 do, responsively to a received request, decode one of the selected bank priorities, BANK 0 PRIORITY 60a through BANK 7 PRIORITY 60h, furthering the request only to the one selected bank priority. Immediately upon the decoding and the sending of such request to one of the eight bank priorities, BANK 0 PRIORITY 60a through BANK 7 PRIORITY 60h, another request, and another address, are respectively received from the REQ STACK & CTRL and from the DATA STACK 82, 84 via respective cables 86, 94 and 204, 205 into the REQ DECODER & SELECTOR 206, 207, wherein such next subsequent requests and addresses are immediately decoded prior to the receipt of an acknowledge that the memory banks should have completed the previous request. Upon receipt of a bank acknowledge (path not shown) from the bank priority selection (as uppermost in priority) of the first-issued request, then the REQ DECODER & SELECTORs 206, 207 will issue this second, already decoded request. All stacked requests, and the decode thereof in the REQ DECODER & SELECTOR 206, 207, is on a first-in, first-out basis. The return acknowledge signal from the bank priority, BANK 0 PRIORITY 60a through BANK 7 PRIORITY 60h, to the REQ DECODER & SELECTOR 206, 207, and additionally to REQ DECODER 64, 78, is not shown in the block diagram of FIG. 2.

Continuing in FIG. 2, in a like manner by which four bits of the address were passed from DATA STACK 82, 84 via cables 204, 205 to REQ DECODER & SELECTOR 206, 207, a remaining 17 address bits, 144 data bits, and 6 function bits (+parity) are passed from DATA STACK 82, 84 via cables 204, 205 to DATA SELECTOR 208, 209. Each of two paths of width 161 bits plus parity within each of cables 204, 205 supports that the data, and the remaining bits of address, associated with a next subsequent requested memory location should become lodged within DATA SELECTOR 208, 209, even prior to the receipt of an acknowledge from the bank priorities, BANK 0 PRIORITY 60a through BANK 7 PRIORITY 60h, which indicates that the memory has acted upon a previous request (path of such return acknowledge not shown in FIG. 2). Similarly to the dual paths between each SP0 DATA STACK 82 and REQ DECODER & SELECTOR 206, and between SP1 DATA STACK 84 and REQ DECODER & SELECTOR 207, the dual paths between SP0 DATA STACK 82 and DATA SELECTOR 208, and between SP1 DATA STACK 84 and DATA SELECTOR 209 support of improved performance due to time-overlap. The DATA SELECTORs 208, 209 do supply via respective cables 92, 100, both 144 bits of data, a (remaining) 17 bits of addressing, and 6 bits of function (plus parity) to the respective SP0, SP1 ports of BANK MULTIPLEXER 60i.

Continuing in FIG. 2, two-word-width interfaces are accorded to each of four input output processors, IOP0 through IOP3, and like two-word-width-interfaces are accorded to each of four Instruction Processors, IP4 through IP7. Upon such interface up to four requests simultaneously arising undergo selection in a first level priority. Requests from IOP0 through IOP3 respectively received as signals IOP0 REQ through IOP3 REQ on cable 202a are selected amongst in IOP PRIORITY 52 to produce a single, highest priority one, request output on line 62. Responsively also to said first-level-priority selected one request, the IOP PRIORITY 52 controls via two multiplexed selection lines 54 the IOP DATA MUX 56 to select amongst data, address, function, and start/end field information received as signals IOP0 ADRS-DATA-FUNC-S/E through IOP3 ADRS-DATA-FUNC-S/E on cable 202b. In a like manner, first-level IP priority 68 does select amongst signals IP4 REQ through IP7 REQ on cable 203a to pass a highest priority one such request via line 76 to REQ DECODER 78. Simultaneously, such IP PRIORITY 68 will control via two multiplexed selection lines 70 the IP DATA MUX/STACK 72 to select amongst the data, address, function and start/end field information received upon four channels as signals IP4 ADRS-DATA-FUNC-S/E through IP7 ADRS-DATAFUNC-S/E on cable 203b. The IP DATA MUX/STACK 72 is to be distinguished from the IOP DATA MUX 56 for incorporating a stack capability in the enablement of the block write function, essentially the receipt of write requests to two consecutive addresses. The stacking of two such addresses in enablement of a block write should not be confused with the 8-deep stacking of requests as occurred upon the SP0 and SP1 channel interfaces. The block write function enables firstly that two words plus two words should be sequentially received upon the interface to an IP performing the block write function and that such will be combined into 4 words transferred at one time to DATA MULTIPLEXER 60i and thence to be written in memory "x", and secondly that another two words plus two words are sequentially received, combined, and written in memory "x+1".

Continuing if FIG. 2, the first-level prioritization of the four IOP ports and the four IP ports in respective IOP PRIORITY 52 and IP PRIORITY 68 is received via respective lines 62, 76 at respective REQ DECODER 64, 78 along with four bits of address via respective cables 58, 74. From three of such address bits as do provide for bank selection (bits 2, 20, and 21 or bits 19, 20, and 21), each REQ DECODER 64, 78 does activate (only) one request line of respective cables 66, 80, which one active request line is received at one of the eight bank priorities, BANK 0 PRIORITY 60a through BANK 7 PRIORITY 60h. If two data words, which is the nominal number, are associated with such IOP or IP write requests, then such two data words are emplaced in both the upper two words (word 0 and word 1) and the lower two words (word 2 and word 3) of a four-word field by respective IOP DATA MUX 56 or IP DATA MUX/STACK 72, with the resultant four-word field emplaced on respective cables 58, 74 for transmission to the respective IOP and IP ports of BANK MULTIPLEXER 60i. As will be later seen, communication with the memory stores is at the 4-word-width level being that four words are contained one each within four parallely operative storage modules within each memory bank. Therefore, the alignment of two words within a four-word field is performed immediately at the IOP DATA MUX 56 (in the case of IOP communication) or at the IP DATA MUX/STACK 72 (in the case of IP communication), each memory bank being later controlled in the four storage modules contained therein to selectively write only the upper, or the lower, two words, as the case may be. In a like manner, it is possible for an IOP or an IP to command the writing of but a single word at any location, word 0 through word 3, within the 4-word boundary. Again, the single word will be properly positioned within the word 0 through word 3 location of a 4-word block by the IOP DATA MUX 56 or the IP DATA MUX/ STACK 72. It is the selection control which will later be applied to the storage memory banks which will cause only the appropriate word to be written. Finally, it is possible during a block write operation such as is exercised only by the IP that the IP DATA MUX/STACK 72 should receive, responsively to the block write function code, two successive two-word transmissions of data from an IP, combining both such successive transmissions to be one (word 0 through word 3) four-word block which is emplaced on cable 74 for communication to BANK MULTIPLEXOR 60i. It should thusly be noted that although the interface to the IOP and to the IP is at a granularity of two words per communication cycle, both cable 58 and cable 74 are four words in width.

Continuing in FIG. 2, it is thusly to be noted that the second-level, or bank, priority in the elements of BANK 0 PRIORITY 60a through BANK 7 PRIORITY 60h does each receive a maximum of four requests to prioritize, which requests are resultant from the SP0 interface via cable 90, from the SP1 interface via cable 98, from the IOP interface via cable 66, and/or from the IP interface via cable 80. Each of the bank priorities, BANK 0 PRIORITY 60a through BANK 7 PRIORITY 60h, does prioritize the four requests received to communicate one such request—SP0 requests being of higher priority than SP1 requests being of higher priority than IOP requests being of higher priority than IP requests—to the associated storage memory bank, respective STORAGE MEMORY BANK 0 40a through BANK 7 40h. Communicated on cables 210a through 210h respectively connecting BANK 0 PRIORITY 60a to STORAGE MEMORY BANK 0 40a through BANK 7 priority 60h to BANK 7 40h are four word addressing enabling signals which do enable the respective four storage modules within each memory bank for the selection of all four words (word 0 through word 3), the upper two words (word 0 and word 1), the lower two words (word 2 and word 3), or a single word (word 0 or word 1 or word 2 or word 3) to be written within the respective four storage modules of each memory bank. This word addressing enablement is derived from the least significant two bits, bit 22 and bit 23, of those five bits of addressing information initially received at REQ DECODER & SELECTOR 206, 207 or REQ DECODER 64, 78. Thus by addressing proceeding from the request decoders and the bank priority are individual words (of four such) selected within each of the memory banks (eight such).

The bank priorities, BANK 0 PRIORITY 60a through BANK 7 PRIORITY 60h, just discussed as receiving request signals plus two bits of addressing information also perform a pretranslation of the function codes which direct the ultimate full and partial word reads and writes, and the test-and-set and test-and-clear functions, of the storage memory banks, STORAGE MEMORY BANK 0 40a through STORAGE MEMORY BANK 7 40h. Such pre-translation transforms the 5-bit function code (plus associated parity) from IP or IOP ports or the 6-bit function code (plus associated parity) from an SP port which is associated with the request now prioritized, plus the start and end fields each of 6 bits (plus associated parity) associated with such functions upon the IP or IOP ports, into a uniform format. Now the storage memory banks could be charged with directly receiving, translating, and acting upon the entire functions which deal with such storage memory banks (i.e., excluding functions dealing with the dayclock, system status register, error function register, etc.). The simple functions that the storage memory modules perform are well known in the art and beyond the teaching of this application. All necessary function code and start/ end fields for the accomplishment of such functions could be specified to be routed only along with data and address from the various ports and through the BANK MULTIPLEXER 60i to the storage memory banks. However, the apparatus of the present invention saves a small amount of time in each exercise of a storage memory module by doing some of that function translation which might normally be associated with such modules within the bank priorities, BANK 0 PRIORITY 60a through BANK 7 PRIORITY 60h. Thus the bank priorities might have been called bank priority and control. The path by which the bank priorities, BANK 0 PRIORITY 60a through BANK 7 PRIORITY 60h, do receive 5 or 6 bits of function code (plus associated parity bit) and 12 bits of start/end fields is not shown in FIG. 2, although, as could be imagined, such a path is substantially identical to that proceeding through REQ DECODERs 206, 207, 64, and 78 via respective cables 90, 98, 66, and 80 to BANK 0 PRIORITY 60a through BANK 7 PRIORITY 60h. Similarily, the lines control which proceed from BANK 0 PRIORITY 60a through BANK 7 PRIORITY 60h to respective STORAGE MEMORY BANK 0 40a through STORAGE MEMORY BANK 7 40h are not specifically shown in FIG. 2, although these lines are parallel to cables 210a through 210h. Again, that a pre-translation function has been moved outside the storage memory banks to be accomplished upon an earlier stage in the pipeline is purely a design decision of significance only in that a routineer in the art of digital memory design should be attentive to such an option in the creation of well balanced pipeline stages in the implementation of a very high performance memory.

Considering the prioritization function discussed within the second preceding paragraph, it is to be noted that the bank priorities, BANK 0 PRIORITY 60a through BANK 7 PRIORITY 60h, do receive of but four request inputs because four IOP ports have been previously prioritized into one signal by IOP PRIORITY 52 while four IP ports have been previously prioritized into one signal by IP priority 68. The number of requests which are prioritized by a priority network positively correlates with the required operational time of such a network. In other words, the time needed to decode a 1 of N priority increases as N increases. Consequently, that the bank priorities need prioritize only four requests allows such to operate faster than if such were to prioritize amongst the total ten ports (two SP's, four IOP's, and four IP's) upon which the HPSU communicates. Furthermore, it is to be noted that requests arising from the SP's are directly routed to the bank priorities, with only the competing requests of the IOP's and of the IP's going through a first-level priority determination. Consequently, the priority scheme of the present HPSU may be considered a 2-level priority scheme, the purpose of which is to optimize performance to two SP requestor ports, while simultaneously supporting access by a large number of additional requestors (four+four) on two ports. Further function of the 2-level priority determination of the present invention is described in U.S. patent application Ser. No. 596,206 for MULTI-LEVEL PRIORITY SYSTEM to Scheuneman, et al., the contents of which are incorporated herein by reference.

Continuing in FIG. 2, the BANK MULTIPLEXOR 60i receives four words of data plus 17 bits of address (plus parity) upon each of four portals: those to SP0, SP1, IOP, and IP. The four words of data received on each portal is directed to a storage memory bank, STORAGE MEMORY BANK 0 40a through STORAGE MEMORY BANK 7 40h, under the multiplex selection control respectively received from BANK 0 PRIORITY 60a through BANK 7 PRIORITY 60h on respective cables 211a through 211h. Such data will be written (in the case of a write function) into the storage memory banks, STORAGE MEMORY BANK 0 40a through STORAGE MEMORY BANK 7 40h, by four words, or by two words, or by single word under the control of word selection received from respective BANK 0 PRIORITY 60a through BANK 7 PRIORITY 60h via respective cables 210a through 210h. The addresses received into BANK MULTIPLEXOR 60i through portals SP0, SP1, IOP, and IP—which addresses are 17 bits in length and sufficient therefore to address any four word boundary within each of the storage memory banks which do each contain 512K words—are likewise gated to memory banks, STORAGE MEMORY BANK 0 40a through STORAGE MEMORY BANK 7 40h, via respective cables 212a through 212h also under the gating control of signals arising at BANK 0 PRIORITY 60a through BANK 7 PRIORITY 60h which connect to such BANK MULTIPLEXOR 60i via cables 211a through 211h. It should be recognized that the 4-word width data and accompanying address which is being gated through BANK MULTIPLEXOR 60i from the SP0, SP1, IOP, and IP under the control of the bank priorities BANK 0 PRIORITY 60a through BANK 7 PRIORITY 60h is all being gated simultaneously. The bank priorities, BANK 0 PRIORITY 60a through BANK 7 PRIORITY 60h, resolve competing requests from multiples of the SP0, SP1, IOP, and IP requestors so that the request of SP0 is gated before the request of SP1 is gated before the request of IOP is gated before the request of IP. The maximum number of storage memory banks, STORAGE MEMORY BANK 0 40a through STORAGE MEMORY BANK 7 40h, which may be simultaneously activated responsively to the four gatings of 4-word-wide data plus accompanying address through the BANK MULTIPLEXOR 60i is actually 5, and not 4. Five of the storage memory banks may be activated only upon the non conflicting requests to such from SP0, SP1, the highest priority IOP, and a highest priority IP which is also performing the block read operation. All eight storage memory banks, which have a 90 nanosecond cycle time, may be simultaneously active from having been activated upon successive 30 nanosecond periods.

Continuing in FIG. 2, and returning to the manner of granting priority in order that timing may be first discussed, it should be known that upon the granting of bank priority by BANK 0 PRIORITY 60a through BANK 7 PRIORITY 60h an acknowledge signal is returned, via paths not shown, to the respective one of the ports which did give rise to that request now gated in bank priority. Such acknowledge(s) is (are) returned either to REQ STACK & CTRL 82, to REQ STACK & CTRL 84, to IOP PRIORITY 52, and/or to IP PRIORITY 68 to inform such that a request has been gated to the appropriate memory bank, and that the requestor may be acknowledged and another subsequent request obtained therefrom. In the case of the SP0 and SP1 interface ports, such next subsequent request from the SP goes on the 8-deep request stacks. Also responsively to such acknowledge, the SP0 DATA STACK 82, the SP1 DATA STACK 84, the IOP DATA MUX 56, and the IP DATA MUX/STACK 72 will be controlled by the associated request logic to no longer hold the current data and address upon the paths to BANK MULTIPLEXOR 60i, but rather to emplace next subsequent data and address upon such paths. Finally, the return of this bank priority acknowledge to a port the request from which gave rise to same, for example, the return of an acknowledge from BANK 0 PRIORITY 60a to the REQ STACK & CTRL and SP0 DATA STACK 82, does allow of the issuance of further, subsequent, requests. In the case of the SP ports, such subsequent requests responsive to such acknowledges will issue off the stacks of the SP ports at a period of 30 nanoseconds. The continued communication of each acknowledge, across long cables, to the requestor, the processing of such acknowledge within a requestor, and the return responsively to such acknowledge of a further request is at a timing such that if five successive such requests are stacked, as is exceeded by the 8-deep request stacks for the SP0 and SP1 ports, then such request stacks will not be empty (repetitive SP requests ensuing) even should successive requests be honored from such stacks at a rate of 30 nanoseconds. In attainment of this fastest, 30 nanoseconds, response time to consecutive requests it should be known that each of the storage memory banks, STORAGE MEMORY BANK 0 40a through STORAGE MEMORY BANK 7 40h, has a 90 nanosecond cycle time. Therefore, consecutive requests need reference successive (as will be the case when addressing is incrementally increasing by four), or at least different, ones of the storage memory banks upon each of up to three consecutive subsequent requests if the fastest, 30 nanoseconds, operational rate is to be obtained.

The manner of the prioritized requesting and addressing of eight memory banks, STORAGE MEMORY BANK 0 40a through STORAGE MEMORY BANK 7 40h, having been preliminarily seen in FIG. 2, a further statement upon the time performance of the HPSU is possible. Each of the eight memory banks, STORAGE MEMORY BANK 0 40a through STORAGE MEMORY BANK 7 40h, can each read or write four words each 90 nanoseconds. The total bandpass of all eight such memory modules is thusly 355.55 megawords per second, or 12.8 gigabits per second. When indexing (normally consecutively) through successive ones of the memory banks, each of the SP0 and SP1 data ports can support the reading and/or writing of four words each 30 nanoseconds. This is equivalent to a bandwidth of 133.33 megawords per second for each such port, or 9.6 gigabits per second for both such ports combined. The bandpass to the IOP's, collectively, is in respect of the concurrency of pending requests from plural IOP's, and the time which it takes to communicate the acknowledge of each such request back to the associated IOP and receive, responsively thereto, a next subsequent request. Such numbers of IOP's and times of interface communication limits reading and writing on the collective IOP ports to two words per 120 nanoseconds, or 16.66 megawords per second, or 600 megabits per second. The collective ports of communication to the IP's would exhibit like performance, save only that the block read mode, supported only to the IP's, does enable of the transfer of eight words every 240 nanoseconds, which is equal to 33.33 megawords per second, which is equal to 1.2 gigabits per second for the 36-bit words of the present invention. The total bandpass of the HPSU actually utilizable is thusly 133.33 megawords per second to each of two SP ports, 16.66 megawords per second to the ports of the IOP's collectively, and 33.33 megawords per second to the ports of the IP's collectively; a total 316.66 megawords per second, or 11.4 gigabits per second. The design accommodation visible in FIG. 2 which makes such high performance possible are as follows. The memory is 8-way interleaved: each of the storage memory banks, STORAGE MEMORY BANK 0 40*a* through STORAGE MEMORY BANK 7 40*h*, is independently addressable and simultaneously operatable. There is a request (and data and address and function) stack for each of the highest performance SP ports. Such stacks, holding requests 8-deep in the present invention, are primarily useful to requestors which do make ordered references to vast amounts of data, and which do make references to instructions and particularly to branching address references proceeding from such instructions much more seldomly. Such is the nature of array, or vector, processors such as are the SP's supported by the HPSU. Finally, if a large number of requestors, ten in the case of the present invention, are to be granted parallel access to the common memory stores, then it is of utility that the priority determination amongst such should be accomplished at minimum delay to the highest priority, highest speed, channels. This is accomplished in the HPSU shown in the block diagram of FIG. 2 by a 2-level priority determination: a first-level priority determination amongst four IOP's in IOP PRIORITY 52 and amongst four IP's in IP PRIORITY 68, with a second-level, bank, priority determination amongst two SP's, the prioritized IOP, and the prioritized IP in the bank priorities, BANK 0 PRIORITY 60*a* through BANK 7 PRIORITY 60*h*. An "odd" address and "even" address pipeline scheme is also employed in bringing the requests and addresses from the stacks of such upon the SP ports expeditiously to the bank priorities. It may thus be realized, parallelism and multiplicity of other resource such as the storage memory banks permitting, that the performance of the present invention to read and to write data each 30 nanoseconds is essentially based on the performance of the priority network, which performance at a 30 nanoseconds pipelined cycle time to two high-speed SP ports is the more remarkable for also according prioritized service to four IOP's and four IP's.

Continuing in FIG. 2, each of the STORAGE MEMORY BANK 0 40*a* through STORAGE MEMORY BANK 7 40*h* memory stores contains 512K 36-bit words plus associated parity and error correction code bits. Each of the storage memory banks, STORAGE MEMORY BANK 0 40*a* through STORAGE MEMORY BANK 7 40*h*, receives four words (144 bits) plus 17 bits of address from the BANK MULTIPLEXER 60*i* via respective buses 212*a* through 212*h*. Five bits of function code are received from respective bank priority. Each of the memory storage banks, BANK 0 40*a* through BANK 7 40*h*, has four output ports—SP0, SP1, IOP, and IP output ports each of which output ports is four words wide. Each of the storage memory banks, STORAGE MEMORY BANK 0 40*a* through STORAGE MEMORY BANK 7 40*h*, receives 4 control bits from respective BANK 0 PRIORITY 60*a* through BANK 7 PRIORITY 60*h* via respective cables 210*a* through 210*h*, which 4 control lines code direct the storage memory bank to read or write data to designated one(s) only of the four parallel storage modules combined within each storage memory bank. Four storage modules, designated WORD 0, WORD 1, WORD 2, and WORD 3 storage modules, each containing 131K 36-bit words plus associated parity and error correction bits, are contained within each of the storage memory banks. The entire storage memory bank bit is addressed upon a four-word boundary, and each of the STORAGE MODULEs WORD 0 through WORD 3 therein enabled for the storage of an associated one of the four data words, WD0 to WD3 received from the BANK MULTIPLEXER 60*i*. In accordance with the type of function being exercised upon the storage memory bank, the signals received from the bank priority will enable that either all four words, the upper two words (WORD 0 and WORD 1), the lower two words (WORD 2 and WORD 3), or an individual one (WORD 0 through WORD 3) of the STORAGE MODULEs will be written with data during a single write operation. The ports SP0, SP1, IOP, and IP occurring on each of the STORAGE MODULEs, WORD 0 through WORD 3, are one data word in width, the combination of four such of each type as appear on STORAGE MODULEs WORD 0 through WORD3 combining to form the total four-word wide data buses of respective type SO0, SP1, IOP, and IP which are illustrated to be the four output ports of each of the storage memory modules shown in FIG. 2.

F. Detailed Description of the HPSU Block Diagram Continuing at the Site of the Present Invention The present invention is realized by storage memory banks, each of STORAGE MEMORY BANK 0 40*a* through STORAGE MEMORY BANK 7 40*h*, each of which has multiple output ports. Respective ones of the multiple output ports are wired-OR interconnected, meaning electrically connected in common upon a bus wherein each signal will be the logical 'OR' function of the concurrent signal drive from all output ports, between plural ones of the storage memory banks. Each of the storage memory banks, STORAGE MEMORY BANK 0 40*a* through STORAGE MEMORY BANK 7 40*h*, receives a two bit code from the respective bank priority, BANK 0 PRIORITY 60*a* through BANK 7 PRIORITY 60*h*, which two bit code identifies whether the storage memory bank is being requested by SP0, SP1, an IOP, or an IP. The storage memory bank utilizes this two bit code, which may be considered to be transferred on connective paths not shown in FIG. 2 but which are parallel to cables 210*a* through 210*h*, to select a corresponding single one output port, the SP0 or SP1 or IOP or IP output port, through which, and onto the wired-OR interconnection bus connected thereto, four words of read data plus associated parity bits will be gated. Each of the eight storage memory banks actually consists of four parallel storage modules each storing one word of data plus associated check and parity bits. It is actually each of these four parallel storage modules which is controlled, in parallel, to gate one word plus associated parity bits onto one wired-OR bus: the four storage modules acting in parallel to gate either four words or two words or one word—as the case may be as established by the word enablements carried on cables 210*a-h*—always onto but a single one of the SP0, SP1, IOP, or IP wired-OR communication busses. Since the prioritization simultaneously performed in each bank priority, BANK 0 PRIORITY 60*a* through BANK 7 PRIORITY 60*h*, is between a maximum of four requests arising from SP0, SP1, the highest priority one IOP, and the highest priority one IP, a maximum of four storage memory banks will be requested/initiated upon any one 30 nanosecond cycle, and will resultantly to such request/initiation simultaneously produce read data some 120 nanoseconds later. Since each of the maximum four requests was from a different type of requestor—a SP0, a SP1, and IOP, or an IP—then one only storage memory bank will be controlled to utilize each wired-OR communication bus at any one time. When the actual communication time on these buses is in the order of 21.5 nanoseconds, each and every one will normally be in use upon each 30 nanosecond pipelined cycle time of the High Performance Storage Unit, meaning that the utilization duty cycle is good and that this dense (8 storage memory banks×4 storage modules/storage memory bank×(36 data +4 parity) bits/storage module=1280 bits are communicatable), fast (signal communication time equals 22.5 nanoseconds) distributive (data from a total of eight storage memory banks may be transmitted (upon plural cycles) to a total of four types of HPSU output ports) communication network operating over some distance (approximately one meter) and with some power consumption should incur minimum cost. The process by which a storage memory bank, operating at the level of each of four storage modules contained therein, will switch data read of the stores therein to a single output port and to the wired-OR communication bus connected thereto in respect of which type of a requestor did give origin to the request to read such data is further shown in FIG. 3, and discussed in the next following section G. of this specification disclosure.

Continuing in FIG. 2, the manner of communication from the storage memory banks, STORAGE MEMORY BANK 0 40a through STORAGE MEMORY BANK 7 40h to those registers 102a through 102d, which registers provide the final output communication from the HPSU to ten requestors of three types, is accomplished by a combination of wired-OR and logical OR selection and enablement of communication interconnection. Commencing with the interface from the fourword wide SP0 port of each of the four memory storage banks to the OR/REG 102a which is the final register and driver interface to bus 204 communicating at a four-word wide data width to SP0, such interface may be observed to be composed of buses 213a and 213b. The SP0 output ports of the zeroeth, second, fourth, and sixth storage memory banks, STORAGE MEMORY BANK 0 40a, STORAGE MEMORY BANK 2 40c, STORAGE MEMORY BANK 4 40e, and STORAGE MEMORY BANK 6 40g, are wired-OR into the single four-word wide bus 213a. Likewise, the SP0 data output port of banks 1, 3, 5, and 7—STORAGE MEMORY BANK 1, 40b, STORAGE MEMORY BANK 3 40d, STORAGE MEMORY BANK 5 40f, and STORAGE MEMORY BANK 7 40h—are wired-OR Into the single four-word wide data bus 213b. The OR/REG 102a for the SP0 interface to the HPSU will receive a gating signal derived from address bit 21 (the even/odd bank selection bit of the address) which was held in SP0 DATA STACK 82, in order by such gating signal to gate the appropriate bus, and four-word wide data quantity received thereupon into OR/REG 102a. This process will be further shown in FIG. 4 and discussed in section H of this specification disclosure. It should be recalled that due to the function of the bank priorities, BANK 0 PRIORITY 60a through BANK 7 PRIORITY 60h, one only of the storage memory banks, STORAGE MEMORY BANK 0 40a through STORAGE MEMORY BANK 7 40h, will be reading a four-word data quantity to the SP0 port at any one time. Thusly, all eight storage memory banks could have been wired-OR in the SP0 port outputs thereof because one only of such storage memory banks are active at any one time. Such totally wired-OR interconnection would be similar to the manner by which such storage memory banks are currently wired-OR by even and odd paths. The reason why a wired-OR interconnect is utilized between four only storage memory banks, and the two wired-OR bus interconnects thereby created between eight banks are then further gated by logical OR means within output registers, is that the physical length of interconnect, and characteristic load impedences, of these buses and of the elements connected thereto dictate that the mode and manner of interconnect should be substantially as shown in economical support of high performance. In point of fact, the OR/REG 102a is physically located midway between the even storage memory banks and the odd storage memory banks, the illustrated combination of two wired-OR buses communicative thereto thereby offering minimum signal communication time if, as is the case, the logical OR function between such two buses 213a and 213b is accomplished within OR/REG 102a at a shorter time than the signal transmission across the finite physical width, and finite impedance, of four storage memory modules. In other words, and in consideration that the HPSU stores 4M 36-bit words, what is under consideration in the area of electrical communication from the storage memory banks, necessarily of physical size, which store such 4M data words to those singular output ports which will communicate four words with a total HPSU pipeline latency (read access time) as low as 240 nanoseconds (although such time obviously includes more than just the time of communication from the storage memory banks to the output registers) is a method of, and apparatus for, wired-OR connection in combination with logic OR connection for, and in support, of high performance. This high performance communication will transpire in 22.5 nanoseconds. Wired-OR interconnection between storage memory modules and output registers is made possible only because each storage memory module does have multiple output ports, and because between all such storage memory modules only one such will emplace read data upon any one port at any one time.

Continuing in FIG. 2 with the explanation of that interconnection structure which is, in aggregate, supportive of the transfer of 11.4 gigabits per second from the storage memory banks, STORAGE MEMORY BANK 0 40a through STORAGE MEMORY BANK 7 40h to the communication output registers, REGISTERs 102a through 102d, the communication between the SP1 output port of each of the eight storage memory banks to the OR/REG 102b, which is the interface register via four-word wide bus 205 to SP1, is accomplished identically to the manner of communication with SP0 just described. Communication between the IP ports of each of the storage memory banks, STORAGE MEMORY BANK 0 40a through STORAGE MEMORY BANK 7 40h, to the AND/OR/STACK/REG 102d, and communication between the IOP port of each of the storage memory banks and the AND-OR/REG 102c is for each likewise but a combination of two wired-OR buses, one of which is connected to the even ones and one of which is connected to the odd ones of the storage memory banks. Each of the buses is further illustrated, however, to be split into a lower and into an upper half, such as is most readily apparent in illustration of lower half buses 214a1 and 214b1, and in the illustration of upper half buses 214a2 and 214b2, in the connection of the IP port of the storage memory banks to AND-OR-STACK/ REG 102d. The lower half bus carries the two words, WORD 0 and WORD 1, which are output of the respective two STORAGE MODULEs of each storage memory bank, whereas the upper half bus carries the two words, WORD 2 and WORD 3, which are outputs of the remaining two STORAGE MODULEs of each storage memory bank. Recall that upon a normal, two-word read to either an IP or an IOP only the WORD 0-WORD 1, or the WORD 2-WORD 3 pair of the STORAGE MODULEs will be enabled, in accordance with the function code received by and interpreted within each of the storage memory banks, for output. Since during a two-word read operation to an IP as controlled by the bank priority, BANK 0 PRIORITY 60a through BANK 7 PRIORITY, only one of the storage memory banks, STORAGE MEMORY BANK 0 40a through STORAGE MEMORY BANK 7 40h, will be reading to an IP at any one time, then one only of the paths 214a1, 214a2, 214b1, and 214b2 will contain valid read information at any one time. Similarily to the way that the gating signal derived from bit 21 of the address held in SP0 DATA STACK 82 was passed to the SP0 output register OR/REG 102a, a gating signal derived from bit 21 of the address held in IP DATA MUX/STACK 72 will be transferred (path not shown in FIG. 2) to the AND-OR-STACK/REG 102d to cause the gating of either those buses 214a1, 214a2 connective to the even storage memory banks or those buses 214b1, 214b2 connective to the odd storage memory banks. Furthermore, a second gating signal derived from bit 22 of the address held in the IP DATA MUX/STACK 72 will also be transferred (path not shown in FIG. 2) to the AND-OR-STACK/REG 102d to cause the gating of either the lower two-word pair carried on buses 214a1 and 214b1 or the upper two-word pair carried on buses 214a2 and 214b2. This process will be further shown in FIG. 4 and discussed in following section H of this specification disclosure.

The AND-OR-STACK/REG 102d also receives additional information (resultantly from the acknowledgement by the bank priorities) from IP PRIORITY 68, which information does permit of the selection of communication with the proper IP, IP4 through IP7. This selection information is derived from the 2-bit port code from IP PRIORITY 68 carried on cable 70 (path of connection to AND-OR-STACK-REG 102d not shown in FIG. 2). This process is further shown in FIG. 4 and discussed in section H of this specification disclosure.

Communication of data from the storage memory banks to the AND-OR/REG 102c and subsequent communication to a selected one of IOP0 through IOP3 across buses 206 transpires in an equivalent manner. The manner of this selection of a two-word data bus path and of the gating of such to an appropriate one of four requestors is further discussed in section H of this specification disclosure.

Continuing in FIG. 2, there is additional support in the interconnection between the storage memory banks, STORAGE MEMORY BANK 0 40a through STORAGE MEMORY BANK 7 40h, and the AND-OR-STACK/REG 102d (which is the output register to the IP's) by lower buses 214a1, 214b1 an by upper buses 214a2, 214b2 for the special block read function which is capable of being performed (only) to an IP port. During the block read function, two of the storage memory banks are twice simultaneously operative to respectively twice produce a WORD 0-WORD 1 pair and WORD 2-WORD 3 pair in joint constitution of a eight-word data quantity to be read to an IP. Such a eight-word quantity is transmitted by four words upon bus 214a1 and 214b1, and by remaining four words upon bus 214a2 and 214b2, from the selected two memory banks to the AND-OR-STACK/REG 102d. It is because of this function that the word "STACK" appears within the title of AND-OR-STACK/REG 102d: the eight words being held in a stack prior to their issuance, most significant word pair first, by two-word pairs to that IP performing the block read function.

Additionally appearing in FIG. 2 are DC & COMPARE 215 referring to dayclock and comparison circuitry, AUTO TIMER 216 and SYS STATUS 217 which represent additional, miscellaneous functions enabled within the memory. The dayclock and auto timer are loaded from the IP, and show a communication path from such by IP DATA MUX/STACK 72 via bus 74. Additionally, the dayclock of D.C. & COMPARE 215 and the system status register of SYS STATUS 217 may be selectively addressably read to the AND-OR-STACK/REG 102d via respective buses 218 and 219, and then output to the IP interrogating such. These miscellaneous functions, although noted for the sake of completeness, are not integral to the function of the present invention.

In general, from the study of the block diagram of FIG. 2, it should be considered that a very large scale memory is shown therein which is composed of a number of logic structures such logic structures arranged in a particular interconnection and upon particular levels and with particular cooperative interrelationship, which are routine of implementation to a practitioner in the art of digital memory design. The primary difficulties in the implementation of the structure of FIG. 2 by a routineer in art from prior art logic structures, such as priority networks and memories capable of storing data, are twofold. First, if it is recognized that the interface cycle time of synchronous communication to the SP's is not equvalent to the interface cycle time of synchronous communication with the IOP's and IO's, and that moreover such latter interface cycle time is not an integral fraction of the read/write cycle time of the storage memory banks, then the consideration of how to time the logic structures shown in FIG. 2 for synchronous communication with two general classes of requestors (the SP's versus the IOP's and IP's), each of which does communicate at a different interface cycle time, requires further teaching. Such teaching is contained in U.S. patent application Ser. No. (596,130), for a HIGH PERFORMANCE STORAGE UNIT, to Scheuneman, the contents of which are incorporated herein by reference. Second, although internal data paths within the HPSU short of the actual two-word wide interface ports to the IOP's and IP's are uniformly four words in width, the controlled enablement of these data paths so that two-word quantities can be moved interchangeably with four-word quantities, and a two-word width interface supported additionally to a four-word width interface, is deserving of further teaching. This teaching is contained in the next two sections G. and H. of this specification disclosure.

G. Multiple Output Port Storage Module

Figure 3B:
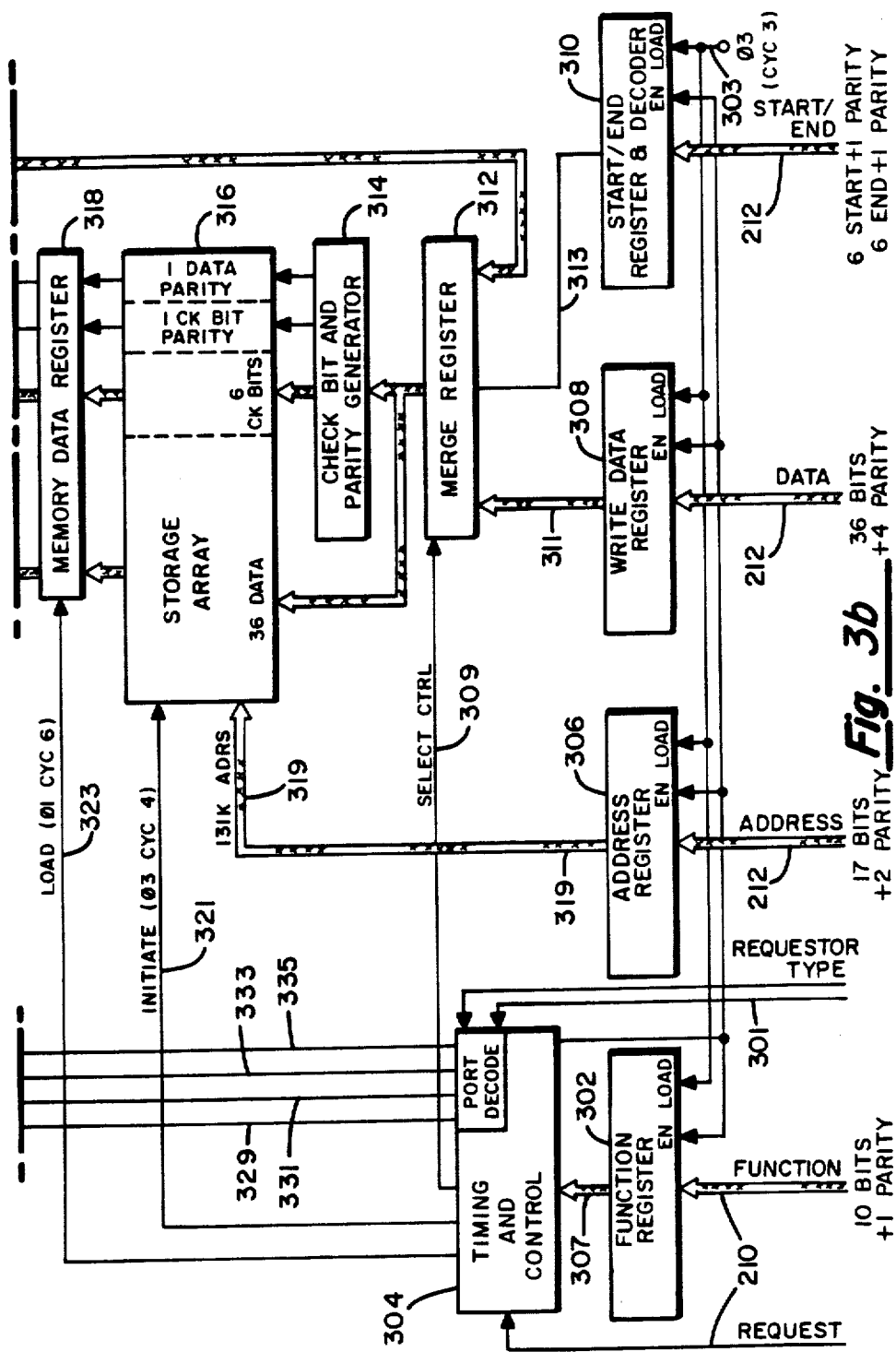

A multiple output port memory storage module, which is utilized in the method of the present invention for wired-OR communication of data from storage memory banks to the output ports (to requestors) of a storage memory resource, is shown in FIG. 3. This multiple output port memory storage module shown in FIG. 3 is identically replicated four times in each of the storage memory banks, STORAGE MEMORY BANK 0 40a through STORAGE MEMORY BANK 7 40h, shown in the block diagram of FIG. 2a. A storage module stores 131K addresses of 36-bit data words (plus associated check and parity bits), or one-quarter of the total 512K addresses of such data words as are stored within each storage memory bank. As may be recalled by momentary reference to the block diagram of FIG. 2, each storage memory bank, and the four storage modules contained therein, did obtain from the respective bank priority request signals which, by virtue of being advanced decoded at the bank priority level in consideration of word-level functions performable on the storage memory banks only be the IOP and IP requestors, were applied as request enablements at the word, or storage module, level. Such pre-translation of the functions directed of the storage memory banks by each of the four types of requestors (which functions are seen within the aforementioned U.S. patent application Ser. No. (596,130) not to be precisely identical) within the bank priority allows of the presentation of function information at a uniform format to the storage memory banks. Returning to FIG. 3, that a memory storing data should be directable to perform read and write, and even partial word, functions is not the subject of the present invention. But the timely, uniform, pre-translations of the function commanded of memory within the bank priority, and the development of enablement requests unique to each storage module (each word) also within the bank priority, is the reason that both signals REQUEST and FUNCTION are shown to be respectively received at TIMING AND CONTROL 304 and at FUNCTION REGISTER 302 via cable 210. Such REQUEST signal line shown in FIG. 3 is actually one of four such carried on each cable 210a through cable 210h, whereas the FUNCTION signal lines are the complete such as are within each of cable 210a through 210h. The signals are not identified to a particular one of the cables 210, a through h, because the storage module shown in FIG. 3 is universal of application within each storage memory bank and throughout all storage memory banks.

Also shown in FIG. 3, and integral to the capability of the storage module (and of the storage memory bank 45 which is built of such storage modules) to gate read data selectively to one of four ports, is the received 2-binary bit code REQUESTOR TYPE on lines 301. This 2-binary bit code, spoken in the preceding section, is received from the associated bank priority, BANK 0 PRIORITY 60a through BANK 7 PRIORITY 60h shown in FIG. 2b. This REQUESTOR TYPE code indicates which of the four types of requestors has been honored in the associated bank priority giving rise to signal REQUEST. on line 210.

Again momentarily referencing the block diagram of FIG. 2, it may be observed that the remaining address, data, and start/end information which is utilized by the storage memory bank, STORAGE MEMORY BANK 0 40a through STORAGE MEMORY BANK 7 40h, was received at such from the four types of memory resource ports via the BANK MULTIPLEXER 60i upon cables 212a through 212h. Returning to FIG. 3, the signals ADDRESS, DATA, and START/END may be observed to be received upon cable 212 into the respective ADDRESS REGISTER 306, WRITE DATA REGISTER 308, and START/END REGISTER AND DECODER 310. All this data and control information is accompanied by parity bits as is the FUNCTION information received via cable 210. All the FUNCTION, ADDRESS, DATA, And START/END information is gated into the associated registers by the occurrence of signal φ3(CYC 3) on line 303, which signal is the third 7.5 nanosecond phase of a 4-phase clock, which 4-phase clock has completed three complete cycles since the original gating of that request which is now honored at the memory storage module into the interface of the HPSU. The timing of the HPSU is further discussed in related U.S. patent application Ser. No. 596,130. It may, however, be noted in FIG. 3 that the gating of the data which will be read within the storage module into the REGISTERs associated with the SP0, SP1, IOP, and IP ports thereof the storage module will occur upon signal φ3 (CYC 7), which signal is the third phase of the seventh cycle of the 4-phase clock, ergo 4 complete 30-nanosecond cycles or 120nanoseconds since the receipt of the REQUEST on line 210. This 120 nanosecond delay in the processing of a single request through the storage module shown in FIG. 3 is part of the overall access time of the HPSU. It should be understood, however, that the operation of the storage memory banks and of the storage modules comprising such is pipelined, and that the read/write cycle time of such storage modules is in actuality 90 nanoseconds. Therefore, the notation of cycles or CYC as are associated with the timing of certain control signals shown in FIG. 3 are an illustration of the sequential processing of a single request, and do reference such, ultimately, to the receipt of such at the interface to the HPSU.

Continuing in FIG. 3, not explicitly shown therein is parity checking transpiring upon all of the information received into FUNCTION REGISTER 302, ADDRESS REGISTER 306, WRITE DATA REGISTER 308, and START/END REGISTER & DECODER 310. It is normal to control a memory to act upon the information received, and to report error status, upon the detection of parity errors in any such information, or upon the detection of errors during the ensuing processing of read and write operations by such memory. The function information within FUNCTION REGISTER 302 is received via cable 307 into TIMING AND CONTROL 304 along with that REQUEST signal uniquely dedicated to this storage module on line 210, causing therein the timed provision of certain control signals. A first such signal SELECT CTRL on line 309 is applied to MERGE REGISTER 312 only in the event of partial word write, causing such to merge the error corrected data received via cable 315 and the write data received via cable 311 in accordance with the start/end signals received from START/END REGISTER & DECODER 310 via lines 313 in order to formulate a 36-bit data quantity to be written. The control proceeding via line 313 from the START/END REGISTER & DECODER 310 simply enables a partial word write operation, which operation is further supported by the path proceeding from the output of ERROR CORRECTION 322 via cable 315 back to MERGE REGISTER 312. The 36-bit data quantity to be written is passed from MERGE REGISTER 312 to the STORAGE ARRAY 316 via cable 317, and also to CHECK BIT AND PARITY GENERATOR 314. Such CHECK BIT AND PARITY GENERATOR 314 assigns six check bits and two parity bits to the 36 bits of data, causing such to also be stored within STORAGE ARRAY 316. Meanwhile, the address from ADDRESS REGISTER 306 is provided to such STORAGE ARRAY 316 via cable 319, such address being capable of distinguishing amongst 131,072 addresses.

The STORAGE ARRAY 316 is caused to initiate a read or a write (restore) cycle upon the occurrence of signal INITIATE ($\phi$3 CYC 4) received on line 321 from TIMING AND CONTROL 304. The results of the read operation are recovered into MEMORY DATA REGISTER 318 under the control of signal LOAD ($\phi$1 CYC 6) received on line 323 from TIMING AND CONTROL 304. The read data in MEMORY DATA REGISTER 318 along with the 6 check bits and 2 parity bits is applied to SYNDROME GEN & PARITY CHECKER 320 wherein the error syndrome bits respective of any errors which may have occurred in the storage of the data quantity result in the generation of the appropriate error syndrome pattern. Such error syndrome pattern is applied via line 327, along with the read data on line 325 to the ERROR CORRECTION 322, wherein the 36-bit data pattern is corrected of single bit errors and wherein double, uncorrectable, errors are detected. The error corrected read data, comprising 36 data bits and four accompanying parity bits, is passed from ERROR CORRECTION 322 in parallel to REGISTER 324, REGISTER 326, REGISTER 328, and REGISTER 330 as are the respective interfaces to the SP0, SP1, IOP, and IP ports of the memory storage module, and of the storage memory bank which are constructed of four such memory storage modules.

Continuing in FIG. 3, and of particular importance to the creation of a multi-port memory storage module which is utilized in the scheme of the present invention, the two binary bit code received as signals REQUESTOR TYPE on cable 301 from the associated bank priority is decoded to four discrete signals within the PORT DECODE area of TIMING AND CONTROL 304. Only one of such signals on lines 329, 331, 333, 335 will be active at any one time resultant to the decode of a particular REQUESTER TYPE in the associated bank priority. These signals on lines 329, 331, 333, and 335 received as the enablement signals to respective REGISTER 324, REGISTER 326, REGISTER 328, and REGISTER 330 do enable one only of such registers to enter that read data plus accompanying parity bits received via cable 315, and to output such upon the attached wired-OR communication bus. The number of bits which will be, at any one time, output upon one only of such buses is 36 data bits plus 4 accompanying parity bits from each memory storage module, or a total 144 data bits plus 16 parity bits from each of the storage memory banks.

By momentary reference to FIG. 2, it should be recalled that not only the capability of gating read data to a single port connected to a corresponding one wired-OR communication bus is required for the operation of the present invention, but also that only one of the storage memory banks, STORAGE MEMORY BANK 0 40a through STORAGE BANK 7 40h, should gate data upon a single wired-OR communication bus at any one cycle, which is a 30 nanosecond cycle of the 4-phase clock within the preferred embodiment implementation. This lack of conflict in the attempted simultaneous utilization of a wired-OR communication bus is based in the two-level bank priority culminating in BANK 0 PRIORITY 60a through BANK 7 PRIORITY 60h, which do, by their simultaneous operations to prioritize amongst four types of requestors, assure that a maximum of four requests, one associated with each type of requestor, can be initiated at a maximum of four memory banks, one request per memory bank, at any one time. Still referencing FIG. 2, remaining to be expounded in the next section H. are (1) the signals by which the output registers, OR/REG 102a to SP0, OR/REG 102b to SP1, AND-OR/REG 102c to IOP, and AND-OR-STACK/REG 102d to IP, may be controlled to select amongst two wired-OR communication buses (one connecting to the even memory banks and one connecting to the odd memory banks) which do transmit data to each, (2) the signals by which the IOP and IP ports may be controlled to select amongst the Upper or the Lower two words which are each carried on a separate wired-OR bus, and (3) the signals by which the IOP port and of the IP port may each be controlled to transfer data to a single one of the up to four IOP's and IP's respectively communicating with these ports.

H. Gating of the Wired-OR Communication Buses onto the Output Ports of the HPSU, and Further Gating of the Read Data to One of Multiple Requestors Communicating with Such Port.

Figure 4B:
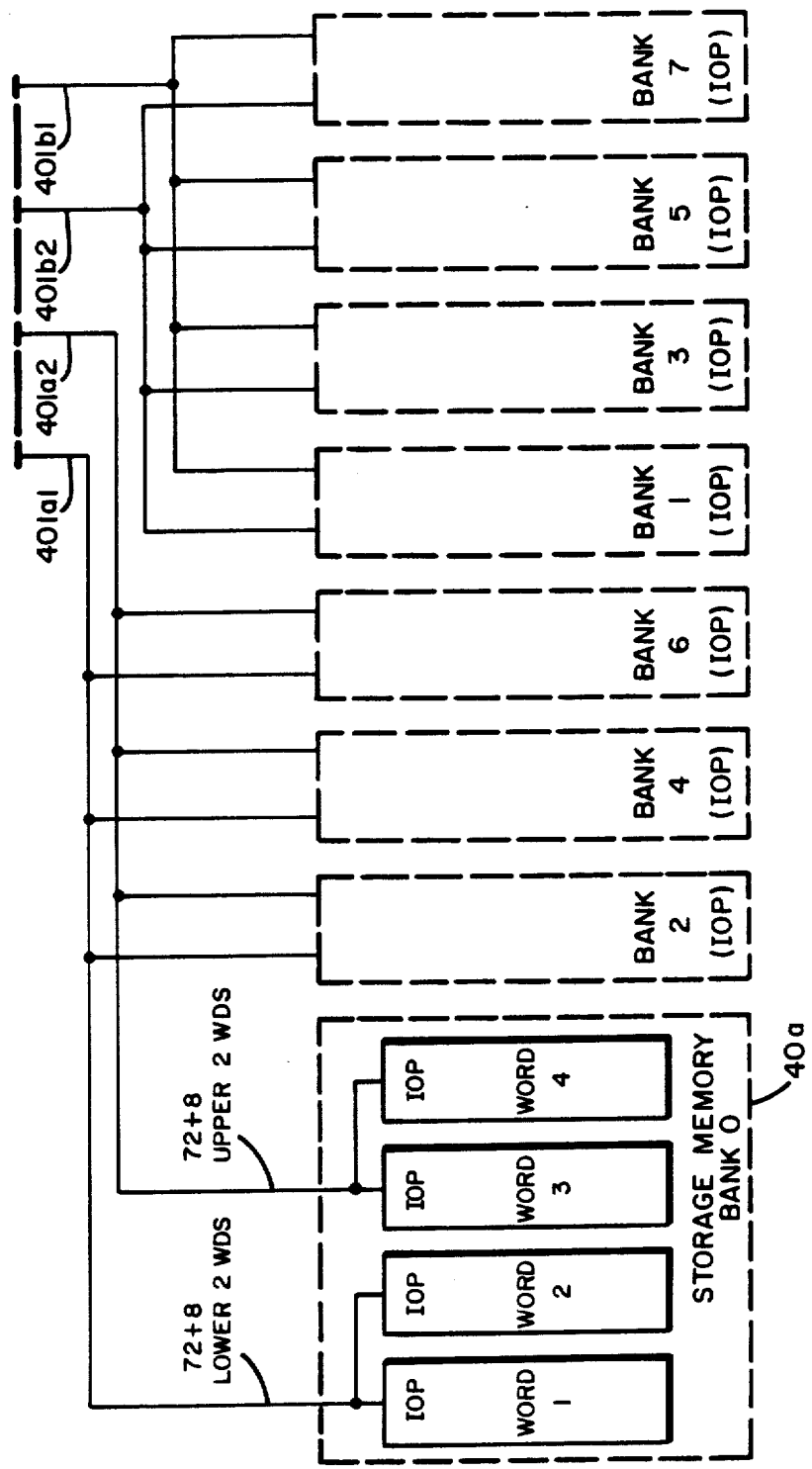

The logic diagram of how the present invention of wired-OR communication buses from storage memory banks to memory resource output ports may be exercised when more than one such wired-OR communication bus communicates to each such output port, and how the present invention may still be utilized if a number of requestors do communicate to a single output port, is shown in FIG. 4. In accordance with the basic teaching of FIG. 1a in combination with FIG. 1c, it is not necessary to the employment of the present invention that either more than one wired-OR communication bus as is associated with each of the four output ports of the memory resource need be employed, nor that any of such output ports would support of communication to more than a single requestor. Obviously, however, by reference to the block diagram of FIG. 2, it may be observed that applicants' preferred embodiment implementation does permit of more wired-OR communication buses than there are memory resource output ports, to-wit: two wired-OR communication buses, one connecting to the even storage memory banks and one to the odd storage memory banks, for each of the output communication ports. Furthermore, the preferred embodiment of the invention further permits that each wired-OR communication bus as is connected between the odd memory banks and either the IOP or IP port, and between the even memory banks and either the IOP or IP port, should further be divisible into two halves, a lower 2-word half and an upper 2-word half. Gating control at each of the IOP and IP ports needs be further established to controllably gate each of the 2-word, upper and lower, halves. Finally, the preferred embodiment of invention does allow that the information controllably gated of the even or the odd wired-OR communication bus connected to the IOP and IP ports, and from the upper 2-word half or the lower 2-word half of each such communication bus, may be further controllably distributed one only of the four IOP's or four IP's as respectively communicate with the IOP and IP ports. All this control utilized in the preferred embodiment of the invention is shown in FIG. 4.

The manner of the application of control to the IOP port, and to the AND-OR/REG 102c which may be momentarily referenced in FIG. 2a, is shown as illustrative of the application of such control in FIG. 4. Momentarily referencing FIG. 2a, the control of the OR/-REG 102a which is the output register for the SP0 port, or the OR/REG 102b which is the output register for the SP1 port, will be somewhat simpler by not requiring the selection amongst a plural number of requestors on each such port. Alternatively, the control of the AND-OR-STACK/REG 102d which is the output register for the IP port will be equivalent to that control for the IOP port which is shown in FIG. 4. Illustrated in FIG. 4 is STORAGE MEMORY BANK 0 40a, showing the four complete storage modules as are associated with WORD 1, WORD 2, WORD 3, and WORD 4 contained therein. It is further illustrated that each such storage module, and the storage memory bank in its entirety, has four output ports, of which the IOP output port from the storage memory bank is of present interest. Further, such IOP output port as across each of the even storage memory banks is combined into wired-OR communication buses 401a, consisting of 401a1 and 401a2, whereas the IOP output port associated with each of odd memory banks (BANKs 1, 3, 5, and 7) are combined into wired-OR communication buses 401b, consisting of 401b1 and 401b2. Further, each such communication bus 401a to the even storage memory banks and 401b to the odd storage memory banks, is divided into lower and upper halves, each half which respectively communicates with the lower two (WORD 1 and WORD 2) storage memory modules of each storage memory bank with which it communicates, or with the upper two (WORD 3 and WORD 4) storage memory modules within each bank with which such communicates. Each of these halves indicated as wired-OR communication buses 401a1, 401a2, 401b1, and 401b2 is thusly of 2-word width, consisting of 72 data bits plus eight accompanying parity bits. Such 2-word wide communication buses 401a1, 401a2, 401b1, 401b2 are received into the indicated REG registers of the OUTPUT WORD PAIR SELECTOR 402 which is part of AND-OR/REG 102c (shown in FIG. 2a) in a like manner to the receipt of 2-word wide wired-OR buses 214a1, 214a2, 214b1, and 214b2 into AND-OR-STACK/REG 102d (shown in FIG. 2a).

The selection problem thus presents itself as selecting amongst these even and odd, lower word pair and upper word pair, wired-OR communication buses as are received at a single output port, the IOP output port in the illustration of FIG. 4. This selection is accomplished simply by address bit 21 and 22 as do respectively select of the even or odd storage memory banks, and of the upper of lower two words within each such bank. These address bits 21 and 22 are obtained as signal ADRS bits 21 and 22, part of cable 58 otherwise distributing DATA, ADRS (and other information) to BANK MUX, meaning the BANK MULTIPLEXER 60i (shown in FIG. 2b), from the IOP DATA MUX 56 (also shown in FIG. 2b). These address bits 21 and 22 are respectively received into REG 400c and REG 400d holding flip-flop registers within OUTPUT CONTROL 400. Address bit 22 held in REG 400d is first used to select in selector SEL 402e from amongst lower two words of read data held within REG 402a or the upper two words of read data held within REG 402b. Likewise and simultaneously, address bit 22 held within REG 400d is used to select within selector SEL 402f from amongst the lower two words of data held within REG 402c or from amongst the upper two words of data held within REG 402d, both such lower and upper half words coming from the odd memory banks. The selected, upper or lower, two words from the even memory banks, and from the odd memory banks, are respectively output of selectors SEL 402e and SEL 402f and received at SEL ODD/EVEN selector 402g. Therein they are selected between under control of address bit 21 stored within REG 402c, the selected two words from the selected odd or even memory banks being further routed in parallel as the read data to output registers REG 404a, REG 404b, REG 404c, and REG 404d as are associated with each of the four IOP's which are communicative with this IOP data port of the HPSU. Thus has the problem of the selection between the two, the even and the odd, wired-OR communication buses which are communicative between all the storage memory banks and a single output port been solved, and additionally the selection between the lower two words and the upper two words which are carried on 2-word wide wired-OR communication buses between each of the storage memory banks and the IOP or IP ports also been solved.

Continuing in FIG. 4, the control which does allow of the selection of the single IOP of the four such connected to an IOP port to which the two words of read data will be communicated is derived from IOP PRIORITY 52, also shown in FIG. 2b. Such IOP PRIORITY 52 does decode amongst the competing requests of up to four IOP requestors to develop a single highest priority one request identified by a 2-bit code on cable 54, which code does select of the data, address, function, and start/end data to be gated from the appropriate IOP through IOP DATA MLX 56. This 2-bit IOP identifier code is also stored within REG 400a and REG 400b of output control 400. Thereafter the set side, Q, and clear side, $\overline{Q}$, of both such REG 400a and REG 400b are utilized in the AND gate network of DECODER 406 to develop four signals, only one of which will be true, which are respectively routed to output registers REG 404a, REG 404b, REG 404c, and REG 404d. These enablements, when gated by the occurrence of CLK $\phi$7 to the same registers, will enable one only of such registers to accept 2-words of read data from SEL ODD/EVEN 402g, and drive such two words of data as 72 data bits plus eight associated parity bits onto the interface lines of the associated IOP, IOP0 through IOP3. Thus has the selection of an individual IOP, one of four such which communicates to the IOP port of the HPSU, been accomplished by control stemming from the original, initial, prioritization of such IOP. The timing of all selection shown in FIG. 4 must be accomplished in consideration of the overall timing of the HPSU, such timing as is furter expounded in related patent application Ser. No. 596,130.

In summary, the present invention has shown that if a multiplicity of storage memory banks are controlled so that only one such will read data as is associated with one type of requestor of a plurality of such requestor types at any time, then each such storage memory bank may employ a like plurality of storage memory output ports, each respectively connecting to a like plurality of wired-OR communication buses ultimately connecting to a like plurality of memory resource output registers, such plurality of memory resource output registers communicating with said like plurality of requestor types, wherein certain requestor types may comprise a plurality of individual requestors. As a further enhancement of the present invention, it has been shown that there need not be one only monolithic wired-OR communication bus between the like output storage memory ports of each of the storage memory banks (which each possess a plurality such storage memory output porrs) but rather that there may be a first wired-OR communication bus connected to the like storage memory output ports upon some, such as the even ones, of the multiplicity of storage memory banks while there exists a second wired-OR communication bus connected to the same storage memory output port upon others, such as the odd ones, of said multiplicity of storage memory banks. Additionally, an enhancement of the invention has been shown that the wired-OR communication need not ultimately be at fixed word-width upon all such plurality of wired-OR communication buses as connect to like storage memory ports at all such multiplicity of multi-ported storage memory banks. Indeed, a single wired-OR communication bus may be split into two halves, a lower half and an upper half, with the ultimate destination memory resource output port controllable for selecting amongst such two halves to output data from one only half at any one time to the requestor(s) connected thereto such memory resource output port. Finally, the present invention has been shown to be compatible with an enhancement wherein a plurality of individual requestors are connected to a memory resource output port of a single type, such memory resource output port being controlled to selectively gate the data to an individual one of the plurality of requestors connected thereto.

While these enhancements, and others, have been mentioned with respect to employment of the method and apparatus of the present invention, it is to be recognized that other enchancements, and equivalent implementations, may suggest themselves to those of skill in the art upon a reading of the present description. Therefore, the following claims should be interpreted so as to encompass all such equivalents which might suggest themselves to one skilled in the art upon a reading of the present specification.

What is claimed is:

1. Within a digital memory resource, a method of distributing data by concurrently communicating the data read from more than one of a plurality of storage memory banks to a plurality of output ports of said digital memory resource, said read data communicating method comprising the steps of:

receiving in a digital memory resource read-requests-plus-associated-addresses from requestors interfaces to said digital memory resource through a plurality of input ports of various types;

prioritizing concurrently pending said read-request-plus-associated-addresses so that(1) the highest priority read-request-plus-associated-address received upon a particular type of said plurality of various types of input ports is prioritized for making an addressed-read-request of each one of said plurality of storage memory banks, and (2) all of said highest priority selected requests-plus-associated-addresses which have been prioritized for making said addressed-read-request of more than one of said plurality of storage memory banks do, in aggregate, contain only one request-plus-associated-address which request was received upon one of said plurality of types of input ports to said digital memory resource;

simultaneously applying said prioritized addressed-read-request, of which only one can have been received from an input port to said digital memory resource of any one type, each to the corresponding addressed one of said storage memory banks;

also simultaneously supplying with each said addressed-read-request information as to which type of input port to said digital memory resource it was received upon;

simultaneously independently reading those more than one of said plurality of storage memory banks which have each received an addressed read-request, producing in equal time at each of said more than one of said plurality of sotrage memory banks the data so read;

selectively emplacing, in accordance with said information as to type of input port supplied, at each of said more than one of said plurality of storage memory banks the read data produced thereby upon a single one of a plurality of wired-OR cummunication buses each connected to a corresponding single port of a plurality of suoh ports upon each of said plurality of storage memory banks;

communicating on each of said plurality of wired-OR communication buses, each connected to corresponding of said more than one of said plurality of storage memory banks, the logical OR result of all of said read data; and transmitting at each one of said plurality of output ports said logical OR result of all said read data upon the respective one of said plurality of wired-OR communication buses to a requestor coupled to each one of said plurality of output ports.

2. An improvement to a digital storage memory unit apparatus containing a plurality of storage memory banks independently and concurrently operative for the reading of data stored therein responsively to read requests thereto, and containing a plurality of interface input and output ports upon which read requests are received from requestors and upon which read data is transmitted back to said requestors responsively to said read requests, said improvement being particularly in the area of such digital storage memory unit apparatus which does commuicably redistribute the data read of said plurality of concurrently operative storage memory banks to said plurality of interface ports wherein said read data is transmitted back to the requestors of said data, siad improvement comprising:

read request prioritization means for receiving upon a pluality of interface ports read requests from the requestors, for proritizing said read requests to form a prioritized plurality of read requests, said prioritized plurality of read requests distinguished in that only one read request within said prioritized plurality of read requests was received from any one of said plurality of interface ports, ergo said prioritized plurality of read requests is less than or equal to in number said plurality of interface ports, for simultaneously applying said prioritzed plurality of read requests one-to-one to a like plurality of said plurality of storage memory banks, and for also simultaneously supplying to selected ones of said like plurality of storage memory banks, information identifying which one of said plurality of interface ports each read request was received upon, which read request is now applied one-to-one to each one of said like plurality of storage memory banks;

a plurality of storage memory bank means each containing readable memory stores of data
- for responding to any read request in concurrent equal time with any one of said multiplicity of storage memory bank means simultaneously requested data;
- for gating, responsively ot information identifying upon which single one of said plurality of interface ports said any read request was received, that said data read responsively to said any read request ot an associated single port of said plurality of storage memory bank means which are in one-to-one correspndence with said plurality of interface ports of said digital storage memory unit apparatus;

a plurality of communication means equal in number to said plurality of interface ports each respectively connecting corresponding ones of said plurality of ports for communicating read data simultaneously gated to corresponding ports of said plurality of storage memory bank means to the respective ones of said plurality of interface ports, each said communication means further comprising:
- a plurality of wired-OR commnication bus means, each connecting to corresponding ones of said plurality of ports on two or more-of said plurality of storage memory bank means, for communicating the logical OR of the data simultaneously read to said corresponding ones of said plurality of portals by said two or more of said plurality of storage memory bank means, said plurality of wired-OR communication bus means connecting, in aggregate, to all corresponding ones of said plurality of ports as occur on all said plurality of storage memory bank means;

a plurality of interface ports equal in number to said plurality df communication means each including means
- for receiving from the associated connected one of said plurality of communication means a plurality of wired-OR logical-OR read data which is communicated by a one of said plurality of wired-OR communication bus means;
- for logically selecting in accordance with logical selection signals said wired-OR read data received upon one of said plurality wired-OR communication bus means,
- for transmitting said selected wired-OR read data to a single one requestor; and logical selection control means, responsive to each address received upon said plurality of interface ports from each of said requestors in accompaniment to each said read request, for providing logical selection signals to said plurality of interface ports which logically selecting each of said plurality of interface ports to be the wired-OR read data producedproduced by one of said data produced by one of said plurality of storage memory bank means as one of said prioritized plurality of read requests from said read request prioritized means, that read request which accompanied each address.

* * * * *